(12) United States Patent
Popovic et al.

(10) Patent No.: US 11,943,088 B2
(45) Date of Patent: Mar. 26, 2024

(54) FIRST AND SECOND COMMUNICATION DEVICES WITH IMPROVED REFERENCE SIGNAL DESIGN

(71) Applicant: HUAWEI TECHNOLOGIES CO., LTD., Guangdong (CN)

(72) Inventors: Branislav M. Popovic, Kista (SE); Peng Wang, Kista (SE); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/882,198

(22) Filed: Aug. 5, 2022

(65) Prior Publication Data
US 2022/0385512 A1 Dec. 1, 2022

Related U.S. Application Data

(63) Continuation of application No. PCT/EP2020/053064, filed on Feb. 7, 2020.

(51) Int. Cl.
*H04L 27/26* (2006.01)
*H04L 5/00* (2006.01)
*H04L 25/02* (2006.01)

(52) U.S. Cl.
CPC ........ *H04L 27/2613* (2013.01); *H04L 5/0051* (2013.01); *H04L 25/0226* (2013.01)

(58) Field of Classification Search
CPC .. H04B 7/0413; H04B 7/0456; H04B 7/0695; H04B 7/0617; H04B 7/0689;
(Continued)

(56) References Cited

U.S. PATENT DOCUMENTS

2011/0142075 A1* 6/2011 Che .................. H04L 1/1854
370/476
2017/0366311 A1* 12/2017 Iyer .................. H04L 5/0007
(Continued)

FOREIGN PATENT DOCUMENTS

| EP | 1993248 A1 | 11/2008 |
| EP | 3618328 A1 | 3/2020 |
| WO | 2020143907 A1 | 7/2020 |

OTHER PUBLICATIONS

3GPP TS 38.211 V15.6.0 (Jun. 2019), "3rd Generation Partnership Project; Technical Specification Group Radio Access Network; NR; Physical channels and modulation(Release 15)" Jun. 2019,, 97 pages.
(Continued)

*Primary Examiner* — Eva Y Puente
(74) *Attorney, Agent, or Firm* — Fish & Richardson P.C.

(57) ABSTRACT

The present disclosure relates to reference signal design methods and devices. In one example method, a first communication device obtains at least one sequence from a subset of sequences in a set of sequences and obtains at least one reference signal based on the obtained at least one sequence. The sequence is phase rotated during its generation, phase rotated in the frequency domain, or cyclically shifted in the time domain based on a constant value $\Delta_q$. The first communication device transmits the reference signal to a second communication device.

19 Claims, 6 Drawing Sheets

(58) Field of Classification Search
CPC .... H04B 7/088; H04B 7/0452; H04B 7/0626; H04W 72/21; H04W 72/23; H04W 72/04; H04W 72/0446; H04W 72/0453; H04W 72/20; H04W 84/12; H04W 88/02; H04L 25/0204; H04L 27/2636; H04L 5/0007; H04L 5/0023; H04L 25/0226; H04L 27/261; H04L 27/2613; H04L 5/0048
USPC ........................................................ 375/262
See application file for complete search history.

(56) References Cited

U.S. PATENT DOCUMENTS

| | | | |
|---|---|---|---|
| 2020/0022176 | A1 | 1/2020 | Osawa et al. |
| 2020/0106575 | A1* | 4/2020 | Masal ................ H04J 11/0056 |
| 2020/0367257 | A1* | 11/2020 | Hormis ............. H04B 7/15528 |

OTHER PUBLICATIONS

3GPP TR 38.901 V15.0.0 (Jun. 2018), "3rd Generation Partnership Project; Technical Specification Group Radio Access Network; Study on channel model for frequencies from 0.5 to 100 GHz (Release 15)," Jun. 2018, 91 pages.

Mow, "A Unified Construction of Perfect Polyphase Sequences," Proceedings of 1995 IEEE International Symposium on Information Theory, Aug. 6, 2002, 1 page.

PCT International Search Report and Written Opinion issued in International Application No. PCT/EP2020/053064 on dated Nov. 5, 2020, 12 pages.

Popovic, "Class of binary sequences for mobile channel estimation," Electronics Letters, vol. 31, No. 12, Jun. 1995, 3 pages.

Popovic, "GCL polyphase sequences with minimum alphabets," Electronics Letters, vol. 30, No. 2, Jan. 1994, 2 pages.

Popovic, "Generalized chirp-like polyphase sequences with optimum correlation properties," IEEE Transactions on Information Theory, vol. 38, No. 4, Jul. 1992, 4 pages.

Suehiro et al., "Modulatable Orthogonal Sequences and their Application to SSMA Systems," IEEE Transactions on Information Theory, vol. 34, No. 1, Jan. 1988, 8 pages.

Svensson et al., "B-IFDMA—A Power Efficient Multiple Access Scheme for Non-frequency-adaptive Transmission," 2007 16th IST Mobile and Wireless Communications Summit, Jul. 2007, 5 pages.

Yamasaki et al., "Phase Rotation for Constructing Uniform Frequency Spectrum in IFDMA Communication," IEICE Transactions on Fundamentals of Electronics Communications and Computer Sciences, vol. 93, No. 12, Dec. 2010, 5 pages.

* cited by examiner

FIRST AND SECOND COMMUNICATION DEVICES WITH IMPROVED REFERENCE SIGNAL DESIGN

CROSS-REFERENCE TO RELATED APPLICATIONS

This application is a continuation of International Application No. PCT/EP2020/053064, filed on Feb. 7, 2020, the disclosure of which is hereby incorporated by reference in its entirety.

TECHNICAL FIELD

The invention relates to a first communication device and a second communication device with improved reference signal design. Furthermore, the invention also relates to corresponding methods, and a computer program.

BACKGROUND

Sounding reference signals (SRSs) are transmitted in communication systems to help receivers to estimate the propagation channel coefficients, usually called channel impulse response (CIR), for any transmitter-receiver antenna port pair. In cellular communication systems, where multiple user equipment (UE) devices are connected to a common base station (BS) device, the SRSs usually denote signals transmitted from the UE to the BS, i.e. on the uplink (UL). The same kind of signals, although sometimes named differently, e.g. channel-state information reference signals and demodulation reference signals, intended to alleviate the CIR estimation in the UE receiver, are transmitted from the BS to the UE, i.e. on the downlink (DL).

Cellular communication systems working in time-division duplex (TDD) mode are designed under assumption that for each UE the UL and DL propagation channels are identical, i.e. the channel reciprocity holds. In such systems the SRSs are transmitted on the UL, and used in the BS to estimate the UL CIR. One of the applications of such UL CIR estimate at each BS's receive antenna port is to interpret it as the DL CIR estimate for that antenna port, and then use a set of such DL CIR estimates to calculate the coefficient for each DL transmit antenna port. The set of such coefficients is usually called a precoding vector/matrix.

This kind of the DL precoding vector/matrix calculation is of particular importance in massive multiple-input multiple-output (mMIMO) systems, which are characterized by a large number of BS transmit/receive antenna ports, and one or few UE transmit/receive antenna ports. The main advantage of UL vs DL SRS transmission for the TDD mMIMO is the absence of the need for the channel state information (CSI) feedback from the UE to the BS, for each BS antenna port. Besides, the CSI feedback, whose format and capacity have to be exactly defined in a communication standard to ensure compatibility of the different UE and BS vendors, would impose a standard-limited resolution of the DL mMIMO precoder, which otherwise, i.e. by UL SRS transmission, is only limited by the implementation capabilities of each individual equipment vendor. Additionally, for a moderate to large number of mMIMO antenna ports (e.g. 64 and larger) and small to moderate number (e.g. up to 30) of concurrent mMIMO users in a cell, the UL SRS needs fewer time-frequency resources.

The above described procedure of mMIMO precoding has some possible sources of errors. The UE periodically transmits its SRS with a period. The mMIMO precoder for DL data should match the DL CIR experienced by DL data. During the time gap between the UL SRS transmission and DL data transmission, the channel may vary due to UE mobility, causing a mismatch between the CIRs experienced by the UL SRS and DL data. Such a mismatch is more pronounced when the time gap is large and/or the UE mobility is high. To guarantee efficient transmission of DL data based on UL channel estimation, the channel estimation error and the channel mismatch should be both kept as low as possible.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a first communication device for a wireless communication system, the first communication device being configured to obtain at least one sequence from a subset of sequences with index q in a set of sequences, wherein the set of sequences comprises Q number of subsets of sequences, each subset of sequences comprising A number of orthogonal sequences, and wherein any two sequences from different subsets of sequences are non-orthogonal;

map the sequence from the subset of sequences onto a subset of subcarriers in a set of subcarriers to obtain a sequence in the frequency domain, wherein the set of subcarriers are divided into t number of subbands;

phase rotate the sequence in the frequency domain based on a constant value $\Delta_q$ to obtain a phase rotated sequence in the frequency domain, wherein the constant value $\Delta_q$ is dependent on the Q number of subsets of sequences, the t number of subbands and the index q of the subset of sequences;

inverse Fourier transform the phase rotated sequence in the frequency domain to obtain a time domain signal; and transmit the time domain signal to a second communication device.

An advantage of the first communication device according to the first aspect is that the generated time domain signal by such a first communication device can have a zero auto-correlation zone (ZAZ) in its periodic auto-correlation function, where the length of the ZAZ is dependent on the t number of subbands in the set of subcarriers, or equivalently the time span of the ZAZ is dependent on the bandwidth of each of the t number of subbands. When the generated time domain signal is transmitted through a propagation channel with the length (or time span) of its CIR no longer than that of the ZAZ and arrives at a second communication device, the CIR of the propagation channel experienced by the time domain signal can be estimated at the second communication device without suffering from the interference from itself, i.e., any channel tap in the CIR could be resolved without interference from any other channel tap. The estimated CIR can then be converted to the frequency domain via discrete Fourier transform (DFT) to obtain the estimated channel coefficient at each subcarrier and each receive antenna port for use in the subsequent DL data transmission.

Another advantage of the first communication device according to the first aspect is that, when multiple of such time domain signals are generated based on different sequences from the same subset of sequences with index q in a set of sequences, by either the same or different first communication devices, there can be a zero cross-correlation zone (ZCCZ) in the periodic cross-correlation function between any two of these time domain signals, where the length of the ZCCZ is dependent on the t number of subbands in the set of subcarriers, or equivalently the time span of the ZCCZ is dependent on the bandwidth of each of the t number of subbands. When each of these generated time domain signals is transmitted through a propagation channel with the length (or time span) of its CIR no longer than that of the abovementioned ZCCZ, and they arrive at a same second communication device at the same time, e.g. by adopting the so-called timing advance (TA) mechanism at each of the first communication devices based on the feedback from the second communication device, the CIR of the propagation channel experienced by each of these time domain signals can be estimated at the second communication device without suffering from the interference from each other. The estimated CIR can then be converted to the frequency domain via DFT to obtain the estimated channel coefficient at each subcarrier and each receive antenna port for use in the subsequent DL data transmission.

A third advantage of the first communication device according to the first aspect is that, when multiple of such time domain signals are generated based on different sequences from different subsets of sequences in a set of sequences, e.g. by different first communication devices, there can be a ZCCZ in the periodic cross-correlation function between any two of these time domain signals, where the length of the ZCCZ is dependent on the t number of subbands in the set of subcarriers, the indices of their corresponding belonging subsets of sequences q, and their corresponding constant values $\Delta_q$, or equivalently the time span of the ZCCZ is dependent on the bandwidth of each of the t number of subbands, the index of their corresponding belonging subsets of sequences q, and their corresponding constant values $\Delta_q$. In one case, each of these generated time domain signals is transmitted through a propagation channel with the length (or time span) of its CIR no longer than that of the abovementioned ZCCZ, and they arrive at a same second communication device at the same time, e.g. by adopting the so-called TA mechanism at each of the first communication devices based on the feedback from the second communication device. Then the CIR of the propagation channel experienced by each of these time domain signals can be estimated at the second communication device without suffering from the interference from each other. In another case, each of these generated time domain signals is transmitted through a propagation channel, where the length (or time span) of the CIR of some propagation channels is longer than that of the aforementioned ZCCZ but shorter than that of its ZAZ, and they arrive at a same second communication device at the same time, e.g. by adopting the so-called TA mechanism at each of the first communication devices based on the feedback from the second communication device. Then the CIR of the propagation channel experienced by each of these time domain signals can be estimated at the second communication device by only suffering from the marginal interference from each other. The head of the estimated CIR samples of one first communication device may be only interfered by the tail of the CIR of another first communication device, which might not have a detrimental effect on the estimated CIR, as the CIR power is mostly carried by its head instead of by its tail. The estimated CIR can then be converted to the frequency domain via DFT to obtain the estimated channel coefficient at each subcarrier and each receive antenna port for use in the subsequent DL data transmission.

In an implementation form of a first communication device according to the first aspect, the number of subcarriers in the subset of subcarriers is equal to the length of the sequence and map the sequence onto a subset of subcarriers in a set of subcarriers comprises map each element of the sequence onto each subcarrier in the subset of subcarriers.

Each element of the sequence can be mapped onto each subcarrier in the subset of subcarriers in either ascending or descending order. For example, the kth element of the sequence can be mapped onto the kth subcarrier in the subset of subcarriers, where k=0, 1, 2, etc. and the subcarriers in the subset of subcarriers can be indexed either from the lowest frequency to the highest frequency, or vice versa.

An advantage with this implementation form is that all the elements of the sequence can be exactly mapped on the subset of subcarriers, i.e. there is no element of the sequence left un-mapped and no subcarrier in the subset of subcarriers left un-used. The mapping of the elements of the sequence onto the subset of subcarriers in either ascending or descending order also guarantees the aforementioned ZAZ and ZCCZ properties for the generated time domain signals.

In an implementation form of a first communication device according to the first aspect, the subset of subcarriers comprises $A_{SC}$ number of subcarriers in each of the t number of subbands, wherein the distribution of the $A_{SC}$ number of subcarriers is the same in all the t number of subbands, and wherein the $A_{SC}$ number of subcarriers in each subband is equal to the A number of orthogonal sequences in each subset of sequences, i.e. $A_{SC}=A$.

An advantage with this implementation form is that the same distribution of the $A_{SC}$ number of subcarriers in each of the t number of subbands guarantees the aforementioned ZAZ and ZCCZ properties for the generated time domain signals. In addition, the same $A_{SC}$ number of subcarriers in each subband as the A number of orthogonal sequences in each subset of sequences can guarantee that there exist A number of orthogonal sequences in each subset of sequences, and that any two time domain signals generated based on the sequences from the same subset of sequences in the set of sequences can have a ZCCZ in the periodic cross-correlation function between them, where the length of the ZCCZ is dependent on the t number of subbands in the set of subcarriers, or equivalently the time span of the ZCCZ is dependent on the bandwidth of each of the t number of subbands.

In an implementation form of a first communication device according to the first aspect, the distribution of the $A_{SC}$ number of subcarriers in each subband is consecutive.

An advantage with this implementation form is that it can meet certain frequency spectrum constraint, e.g. when the subset of subcarriers need to belong to one or a few consecutive interlaces in the set of subcarriers which are divided into multiple interlaces, where an interlace comprises a number of equidistantly located resource blocks each consisting of a number of (e.g. 12) consecutive subcarriers. By this means, the corresponding generated time domain signal can be frequency division multiplexed (FDMed) with some other time domain signals generated based on the rest of interlaces and concurrently received at a second communication device without interference from each other.

In an implementation form of a first communication device according to the first aspect, the distribution of the $A_{SC}$ number of subcarriers in each subband is non-consecutive.

An advantage with this implementation form is that it provides more flexibility for the distribution of the subset of subcarriers in the set of subcarriers. By allowing non-consecutive distribution, the $A_{SC}$ number of subcarriers can spread in each subband such that an even longer ZAZ length/time span can be achieved in the periodic auto-correlation function of the generated time domain signal. It also enables to meet certain frequency spectrum constraint, e.g. when the subset of subcarriers need to belong to a few non-consecutive interlaces in the set of subcarriers which are divided into multiple interlaces, where an interlace comprises a number of equidistantly located resource blocks each consisting of a number of (e.g. 12) consecutive subcarriers. By this means, the corresponding generated time domain signal can be FDMed with some other time domain signals generated based on the rest of interlaces and concurrently received at a second communication device without interference from each other.

In an implementation form of a first communication device according to the first aspect, the distribution of the $A_{SC}$ number of subcarriers in each subband is uniform.

An advantage with this implementation form is that the $A_{SC}$ number of subcarriers can spread in each subband such that a maximum ZAZ length/time span can be achieved in the periodic auto-correlation function of the generated time domain signal.

In an implementation form of a first communication device according to the first aspect, the distribution of the $A_{SC}$ number of subcarriers in each subband is non-uniform.

An advantage with this implementation form is that it provides more flexibility for the distribution of the subset of subcarriers in the set of subcarriers. By allowing non-uniform distribution, the $A_{SC}$ number of subcarriers can spread in each subband such that an even longer ZAZ length/time span can be achieved in the periodic auto-correlation function of the generated time domain signal. It also enables to meet certain frequency spectrum constraint, e.g. when the subset of subcarriers need to belong to a few non-consecutive interlaces in the set of subcarriers which are divided into multiple interlaces, where an interlace comprises a number of equidistantly located resource blocks each consisting of a number of (e.g. 12) consecutive subcarriers. By this means, the corresponding generated time domain signal can be FDMed with some other time domain signals generated based on the rest of interlaces and concurrently received at a second communication device without interference from each other.

In an implementation form of a first communication device according to the first aspect, the constant value $\Delta_q$ is a positive integer and determined according to any of the formulas $$\Delta_q = q\lfloor t/Q \rfloor, q=0,1,\ldots,Q-1, \text{ or}$$

$$\Delta_q = \lfloor qt/Q \rfloor, q=0,1,\ldots,Q-1$$

where $\lfloor \ldots \rfloor$ is the flooring-operator.

An advantage with this implementation form is that it maximizes the minimum length/time span of the ZCCZ in the periodic cross-correlation function between any two time domain signals generated based on sequences from different subsets of sequences in the set of sequences. The minimum ZCCZ length/time span for any two time domain signals generated based on sequences from different subsets of sequence in the set of sequences can be as long as about 1/Q of the ZCCZ length/time span for two time domain signals generated based on sequences from a same subset of sequence in the set of sequences. This maximized minimum ZCCZ length/time span minimizes the detrimental interference effect on the CIR estimation when the corresponding two time domain signals are transmitted and arrive at the second communication device synchronously.

In an implementation form of a first communication device according to the first aspect, the first communication device is further configured to obtain a control message from the second communication device, the control message comprising at least one parameter indicating the sequence, wherein the control message comprises a first parameter indicating an index of the sequence in a superset of sequences for the communication system, the control message comprises a first parameter indicating an index of the set of sequences in a superset of sequences for the communication system and a second parameter indicating an index of the sequence in the set of sequences, or the control message comprises a first parameter indicating an index of the set of sequences in a superset of sequences for the communication system, a second parameter indicating an index of the subset of sequences in the set of sequences and a third parameter indicating an index of the sequence in the subset of sequences; and obtain the sequence based on the control message.

An advantage with this implementation form is that a same or different first communication devices can be assigned with different sequences by a second communication device such that it/they can generate and concurrently transmit different time domain signals with desired ZAZ and/or ZCCZ property to avoid/mitigate the interference between each other when the CIRs of their correspondingly experienced propagation channels are estimated at the second communication device. The signaling of the index of the sequence can be done in an efficient and flexible way. For example, in the case when a first communication device only needs to obtain one sequence, lower signaling overhead can be achieved by letting the control message comprise only a first parameter, or a first parameter and a second parameter, compared to the scenario when the control message comprises a first, second and third parameters. In the case when a first communication device needs to obtain multiple sequences for transmission from different antenna ports, lower signaling overhead can be achieved by letting the control message comprise a first parameter and a second parameter, or a first, second and third parameters, compared to the scenario when the control message only comprises a first parameter. The signaling overhead reduction is achieved by restricting these sequences to be from the same set of sequences or even the same subset of sequences, such that they share a common index of the set of sequences and/or a common index of the subset of sequences in a same set of sequences.

In an implementation form of a first communication device according to the first aspect, the time domain signal is a reference signal.

An advantage with this implementation form is that when the generated time domain signal is transmitted by a first communication device, it is pre-known at the second communication device. Upon reception, the second communication device can thereby regard it as a reference signal and perform the function of a reference signal, e.g. channel estimation, based on the received time domain signal.

In an implementation form of a first communication device according to the first aspect, obtain at least one sequence comprises
    obtain two or more sequences, wherein the two or more sequences are from the same subset of sequences.

An advantage with this implementation form is that the two or more time domain signals generated based on the two or more sequences from the same subset of sequences in a set of sequences can maintain a ZCCZ between them whose length/time span can be as long as that of their ZAZ. When such two or more time domain signals are transmitted concurrently from different antenna ports of the first communication device and arrive at the second communication device at the same time, the CIR of the propagation channel experienced by each of these time domain signals can be estimated at the second communication device without suffering from the interference from each other, provided that the length/time span of these CIRs is no longer than that of the above maintained ZCCZ. In addition, selecting two or more sequences from the same subset of sequences can reduce the signaling overhead, as the signaling of these two or more sequences can share a common index of the subset of sequences and a common index of the set of sequences.

According to a second aspect of the invention, the above mentioned and other objectives are achieved with a second communication device for a communication system, the second communication device being configured to
    receive a time domain signal in a radio channel from the first communication device, wherein the received time domain signal is associated with a sequence;
    Fourier transform the received time domain signal to obtain the sequence in the frequency domain of the received time domain signal;
    obtain at least one local sequence from a subset of sequences with index q in a set of sequences comprising Q number of subsets of sequences, each subset of sequences comprising A number of orthogonal sequences, and wherein any two sequences from different subsets of sequences are non-orthogonal;
    map the local sequence onto a subset of subcarriers in a set of subcarriers to obtain the local sequence in the frequency domain, wherein the set of subcarriers are divided into t number of subbands;
    phase rotate the local sequence in the frequency domain based on a constant value $\Delta_q$ to obtain a phase rotated local sequence in the frequency domain, wherein the constant value $\Delta_q$ is dependent on the Q number of subsets of sequences, the t number of subbands and the index q of the subset of sequences; and
    estimate the radio channel based on the phase rotated local sequence in the frequency domain and the sequence in the frequency domain of the received time domain signal.

That the received time domain signal is associated with a sequence can mean that the received time domain signal comprises at least one time domain signal associated with a sequence, wherein the time domain signal comprised in the received time domain signal is generated based on the sequence at a first communication device and transmitted from the first communication device.

A local sequence can be understood to be a sequence which is obtained locally in the second communication device and not received by the second communication device e.g. from a first communication device.

Estimate the radio channel can comprise estimate the channel impulse response in the time domain and/or the channel coefficients of all or a portion of the sub-subcarriers in the set of subcarriers in the frequency domain.

An advantage of the second communication device according to the second aspect is that that the second communication device can estimate the propagation channel experienced by a time domain signal transmitted from a first communication device in an efficient and accurate way. For example, when the received time domain signal comprises the time domain signal transmitted by the first communication device which is generated based on the same sequence as the local sequence obtained at the second communication device, a matched filtering based channel estimation can be performed to obtain the estimated CIR of the propagation channel experienced by the transmitted time domain signal comprised in the received time domain signal.

In one implementation, the propagation channel experienced by the time domain signal transmitted by the first communication device and comprised in the received time domain signal has its CIR length/time span no longer than that of the ZAZ in the periodic auto-correlation function of the transmitted time domain signal, where the length of the ZAZ is dependent on the t number of subbands in the set of subcarriers, or equivalently the time span of the ZAZ is dependent on the bandwidth of each of the t number of subbands. In this case, such CIR can be estimated at the second communication device without suffering from the interference from itself, i.e. any channel tap in the CIR could be resolved without interference from any other channel tap. The estimated CIR can then be converted to the frequency domain via DFT to obtain the estimated channel coefficient at each subcarrier and each receive antenna port for use in the subsequent DL data transmission.

In another implementation, the received time domain signal comprises multiple time domain signals that are generated based on different sequences from the same subset of sequences with index q in a set of sequences, which are transmitted by either the same or different first communication devices, and arrive at the second communication device at the same time, e.g. by adopting the so-called TA mechanism at each of the first communication devices based on the feedback from the second communication device. Furthermore, there exists a ZCCZ in the periodic cross-correlation function between any two of these time domain signals, where the length of the ZCCZ is dependent on the t number of subbands in the set of subcarriers, or equivalently the time span of the ZCCZ is dependent on the bandwidth of each of the t number of subbands. In this case, when the propagation channel experienced by each of these transmitted time domain signals has its CIR length/time span no longer than that of the abovementioned ZCCZ, the CIR of the propagation channel experienced by each of these time domain signals can be estimated at the second communication device without suffering from the interference from each other. The estimated CIR can then be converted to the frequency domain via DFT to obtain the estimated channel coefficient at each subcarrier and each receive antenna port for use in the subsequent DL data transmission.

In a third implementation, the received time domain signal comprises multiple time domain signals that are generated based on sequences from different subsets of sequences in a set of sequences, which are transmitted by different first communication devices, and arrive at the second communication device at the same time, e.g. by adopting the so-called TA mechanism at each of the first communication devices based on the feedback from the second communication device. Furthermore, there exists a ZCCZ in the periodic cross-correlation function between any two of these time domain signals, where the length of the ZCCZ is dependent on the t number of subbands in the set of subcarriers, the indices of their corresponding belonging subsets of sequences q, and their corresponding constant values $\Delta_q$, or equivalently the time span of the ZCCZ is dependent on the bandwidth of each of the t number of subbands, the indices of their corresponding belonging subsets of sequences q, and their corresponding constant values $\Delta_q$. In one case, when the propagation channel experienced by each of these transmitted time domain signals has its CIR length/time span no longer than that of the abovementioned ZCCZ, each of such CIRs can be estimated at the second communication device without suffering from the interference from each other. In another case, when the propagation channel experienced by some of these transmitted time domain signals has its CIR length/time span longer than that of the aforementioned ZCCZ but shorter than that of the ZAZ of the corresponding transmitted time domain signal, each of such CIRs can be estimated at the second communication device by only suffering from the marginal interference from each other. The head of the estimated CIR samples of one first communication device may be only interfered by the tail of the CIR of another first communication device, which might not have a detrimental effect on the estimated CIR, as the CIR power is mostly carried by its head instead of by its tail. The estimated CIR can then be converted to the frequency domain via DFT to obtain the estimated channel coefficient at each subcarrier and each receive antenna port for use in the subsequent DL data transmission.

In an implementation form of a second communication device according to the second aspect, the number of subcarriers in the subset of subcarriers is equal to the length of the sequence, and map the sequence onto a subset of subcarriers in a set of subcarriers comprises map each element of the sequence onto each subcarrier in the subset of subcarriers.

Each element of the sequence can be mapped onto each subcarrier in the subset of subcarriers in either ascending or descending order. For example, the kth element of the sequence can be mapped onto the kth subcarrier in the subset of subcarriers, where k=0, 1, 2, etc. and the subcarriers in the subset of subcarriers can be indexed either from the lowest frequency to the highest frequency, or vice versa.

An advantage with this implementation form is that all the elements of the sequence can be exactly mapped onto the subset of subcarriers, i.e. there is no element of the sequence left un-mapped and no subcarrier in the subset of subcarriers left un-used. The mapping of the elements of the sequence onto the subset of subcarriers in either ascending or descending order also guarantees the aforementioned ZAZ and ZCCZ properties for the generated time domain signals.

In an implementation form of a second communication device according to the second aspect, the subset of subcarriers comprises $A_{SC}$ number of subcarriers in each of the t number of subbands, wherein the distribution of the $A_{SC}$ number of subcarriers is the same in all the t number of subbands, and wherein the $A_{SC}$ number of subcarriers in each subband is equal to the A number of orthogonal sequences in each subset of sequences, i.e. $A_{SC}=A$.

An advantage with this implementation form is that the same distribution of the $A_{SC}$ number of subcarriers in each of the t number of subbands guarantees the aforementioned ZAZ and ZCCZ properties for the generated time domain signals. In addition, the same $A_{SC}$ number of subcarriers in each subband as the A number of orthogonal sequences in each subset of sequences can guarantee that there exist A number of orthogonal sequences in each subset of sequences, and that any two time domain signals generated based on the sequences from the same subset of sequences in the set of sequences can have a ZCCZ in the periodic cross-correlation function between them, where the length of the ZCCZ is dependent on the t number of subbands in the set of subcarriers, or equivalently the time span of the ZCCZ is dependent on the bandwidth of each of the t number of subbands.

In an implementation form of a second communication device according to the second aspect, the distribution of the $A_{SC}$ number of subcarriers in each subband is consecutive.

An advantage with this implementation form is that it can meet certain frequency spectrum constraint, e.g. when the subset of subcarriers need to belong to one or a few consecutive interlaces in the set of subcarriers which are divided into multiple interlaces, where an interlace comprises a number of equidistantly located resource blocks each consisting of a number of (e.g. 12) consecutive subcarriers. By this means, the corresponding generated time domain signal can be FDMed with some other time domain signal generated based on the rest of interlaces and concurrently received at a second communication device without interference from each other.

In an implementation form of a second communication device according to the second aspect, the distribution of the $A_{SC}$ number of subcarriers in each subband is non-consecutive.

An advantage with this implementation form is that it provides more flexibility for the distribution of the subset of subcarriers in the set of subcarriers. By allowing non-consecutive distribution, the $A_{SC}$ number of subcarriers can spread in each subband such that an even longer ZAZ length/time span can be achieved in the periodic auto-correlation function of the generated time domain signal. It also enables to meet certain frequency spectrum constraint, e.g. when the subset of subcarriers need to belong to a few non-consecutive interlaces in the set of subcarriers which are divided into multiple interlaces, where an interlace comprises a number of equidistantly located resource blocks each consisting of a number of (e.g. 12) consecutive subcarriers. By this means, the corresponding generated time domain signal can be FDMed with some other time domain signal generated based on the rest of interlaces and concurrently received at a second communication device without interference from each other.

In an implementation form of a second communication device according to the second aspect, the distribution of the $A_{SC}$ number of subcarriers in each subband is uniform.

An advantage with this implementation form is that the $A_{SC}$ number of subcarriers can spread in each subband such that a maximum ZAZ length/time span can be achieved in the periodic auto-correlation function of the generated time domain signal.

In an implementation form of a second communication device according to the second aspect, the distribution of the $A_{SC}$ number of subcarriers in each subband is non-uniform.

An advantage with this implementation form is that it provides more flexibility for the distribution of the subset of subcarriers in the set of subcarriers. By allowing non-uniform distribution, the $A_{SC}$ number of subcarriers can spread in each subband such that an even longer ZAZ length/time span can be achieved in the periodic auto-correlation function of the generated time domain signal. It also enables to meet certain frequency spectrum constraint, e.g. when the subset of subcarriers need to belong to a few non-consecutive interlaces in the set of subcarriers which are divided into multiple interlaces, where an interlace comprises a number of equidistantly located resource blocks each consisting of a number of (e.g. 12) consecutive subcarriers. By this means, the corresponding generated time domain signal can be FDMed with some other time domain signal generated based on the rest of interlaces and concurrently received at a second communication device without interference from each other.

In an implementation form of a second communication device according to the second aspect, the constant value $\Delta_q$ is a positive integer and determined according to any of the formulas $$\Delta_q = q \lfloor t/Q \rfloor, \; q=0,1,\ldots,Q-1, \text{ or}$$

$$\Delta_q = \lfloor qt/Q \rfloor, \; q=0,1,\ldots,Q-1$$

where $\lfloor \ldots \rfloor$ is the flooring-operator.

An advantage with this implementation form is that it maximizes the minimum length/time span of the ZCCZ in the periodic cross-correlation function between any two time domain signals generated based on sequences from different subsets of sequences in the set of sequences. The minimum ZCCZ length/time span for any two time domain signals generated based on sequences from different subsets of sequence in the set of sequences can be as long as about 1/Q of the ZCCZ length/time span for two time domain signals generated based on sequences from a same subset of sequence in the set of sequences. This maximized minimum ZCCZ length/time span minimizes the detrimental interference effect on the CIR estimation when the corresponding two time domain signals are transmitted and arrive at the second communication device synchronously.

In an implementation form of a second communication device according to the second aspect, the second communication device is further configured to provide a control message to a first communication device, the control message comprising at least one parameter indicating the sequence, wherein the control message comprises a first parameter indicating an index of the sequence in a superset of sequences for the communication system, the control message comprises a first parameter indicating an index of the set of sequences in a superset of sequences for the communication system and a second parameter indicating an index of the sequence in the set of sequences, or the control message comprises a first parameter indicating an index of the set of sequences in a superset of sequences for the communication system, a second parameter indicating an index of the subset of sequences in the set of sequences and a third parameter indicating an index of the sequence in the subset of sequences.

An advantage with this implementation form is that the second communication device can assign different sequences to a same or different first communication devices such that it can receive different time domain signals from a same or different first communication devices with desired ZAZ and/or ZCCZ property to avoid/mitigate the interference between each other when estimating the CIRs of their correspondingly experienced propagation channels. The signaling of the index of the sequence can be done in an efficient and flexible way. For example, in the case when the second communication device needs to signal a first communication device to obtain only one sequence, lower signaling overhead can be achieved by letting the control message comprise only a first parameter, or a first parameter and a second parameter, compared to the scenario when the control message comprises a first, second and third parameters. In the case when the second communication device needs to signal a first communication device to obtain multiple sequences for transmission from different antenna ports, lower signaling overhead can be achieved by letting the control message comprise a first parameter and a second parameter, or a first, second and third parameters, compared to the scenario when the control message only comprises a first parameter. The signaling overhead reduction is achieved by restricting these sequences to be from the same set of sequences or even the same subset of sequences, such that they share a common index of the set of sequences and/or a common index of the subset of sequences in a same set of sequences.

In an implementation form of a second communication device according to the second aspect, the time domain signal is a reference signal.

An advantage with this implementation form is that the second communication device knows in advance which time domain signal(s) will be transmitted from one or multiple first communication devices and comprised in the received time domain signal. In this case, the second communication device can regard each transmitted time domain signal comprised in the received time domain signal as a reference signal and perform the function of a reference signal, e.g. channel estimation, based on the received time domain signal.

In an implementation form of a second communication device according to the second aspect, provide a control message to a first communication device comprises provide a control message to a first communication device to indicate two or more sequences, wherein the two or more sequences are from the same subset of sequences.

An advantage with this implementation form is that according to the control message, the two or more time domain signals generated at the first communication device are based on the two or more sequence from the same subset of sequences in a set of sequences, which can maintain a ZCCZ between them whose length/time span can be as long as that of their ZAZ. When such two or more time domain signals are transmitted concurrently from different antenna ports of the first communication device and arrive at the second communication device at the same time, the CIR of the propagation channel experienced by each of these time domain signals can be estimated at the second communication device without suffering from the interference from each other, provided that the length/time span of these CIRs is no longer than that of the above maintained ZCCZ. In addition, selecting two or more sequences from the same subset of sequences for a first communication device can reduce the signaling overhead, as the signaling of these two or more sequences can share a common index of the subset of sequences and a common index of the set of sequences.

According to a third aspect of the invention, the above mentioned and other objectives are achieved with a method for a first communication device, the method comprises obtaining at least one sequence from a subset of sequences with index q in a set of sequences, wherein the set of sequences comprises Q number of subsets of sequences, each subset of sequences comprising A number of orthogonal sequences, and wherein any two sequences from different subsets of sequences are non-orthogonal;

mapping the sequence from the subset of sequences onto a subset of subcarriers in a set of subcarriers to obtain a sequence in the frequency domain, wherein the set of subcarriers are divided into t number of subbands;

phase rotating the sequence in the frequency domain based on a constant value $\Delta_q$ to obtain a phase rotated sequence in the frequency domain, wherein the constant value $\Delta_q$ is dependent on the Q number of subsets of sequences, the t number of subbands and the index q of the subset of sequences;

inverse Fourier transforming the phase rotated sequence in the frequency domain to obtain a time domain signal; and transmitting the time domain signal to a second communication device.

The method according to the third aspect can be extended into implementation forms corresponding to the implementation forms of the first communication device according to the first aspect. Hence, an implementation form of the method comprises the feature(s) of the corresponding implementation form of the first communication device.

The advantages of the methods according to the third aspect are the same as those for the corresponding implementation forms of the first communication device according to the first aspect.

According to a fourth aspect of the invention, the above mentioned and other objectives are achieved with a method for a second communication device, the method comprises receiving a time domain signal in a radio channel from the first communication device, wherein the received time domain signal is associated with a sequence;

Fourier transforming the received time domain signal to obtain the sequence in the frequency domain of the received time domain signal;

obtaining at least one local sequence from a subset of sequences with index q in a set of sequences comprising Q number of subsets of sequences, each subset of sequences comprising A number of orthogonal sequences, and wherein any two sequences from different subsets of sequences are non-orthogonal;

mapping the local sequence onto a subset of subcarriers in a set of subcarriers to obtain the local sequence in the frequency domain, wherein the set of subcarriers are divided into t number of subbands;

phase rotating the local sequence in the frequency domain based on a constant value $\Delta_q$ to obtain a phase rotated local sequence in the frequency domain, wherein the constant value $\Delta_q$ is dependent on the Q number of subsets of sequences, the t number of subbands and the index q of the subset of sequences; and estimating the radio channel based on the phase rotated local sequence in the frequency domain and the sequence in the frequency domain of the received time domain signal.

The method according to the fourth aspect can be extended into implementation forms corresponding to the implementation forms of the second communication device according to the second aspect. Hence, an implementation form of the method comprises the feature(s) of the corresponding implementation form of the second communication device.

The advantages of the methods according to the fourth aspect are the same as those for the corresponding implementation forms of the second communication device according to the second aspect.

According to a fifth aspect of the invention, the above mentioned and other objectives are achieved with first communication device for a communication system, the first communication device being configured to obtain at least one sequence from a subset of sequences with index q in a set of sequences comprising Q number of subsets of sequences, each subset of sequences comprising A number of orthogonal sequences, wherein any two sequences from different subsets of sequences are non-orthogonal;

map the sequence onto a subset of subcarriers in a set of subcarriers to obtain a sequence in the frequency domain, wherein the set of subcarriers are divided into t number of subbands;

inverse Fourier transform the sequence in the frequency domain to obtain a time domain signal;

cyclically shift the time domain signal based on a constant value $\Delta_q$ to obtain a cyclically shifted time domain signal, wherein the constant value $\Delta_q$ is dependent on the Q number of subsets of sequences, the t number of subbands and the index q of the subset of sequences; and transmit the cyclically shifted time domain signal to a second communication device.

According to a sixth aspect of the invention, the above mentioned and other objectives are achieved with first communication device for a communication system, the first communication device being configured to obtain at least one sequence from a subset of sequences with index q in a set of sequences comprising Q number of subsets of sequences, each subset of sequences in the set of sequences comprising A number of orthogonal sequences, wherein any two sequences from different subsets of sequences are non-orthogonal when each q-th subset of sequences are inversely phase rotated based on a constant value $\Delta_q$;

map the sequence onto a subset of subcarriers in a set of subcarriers to obtain a sequence in the frequency domain, wherein the set of subcarriers are divided into t number of subbands;

wherein the constant value $\Delta_q$ is dependent on the Q number of subsets of sequences, the t number of subbands and the index q of the subset of sequences;

inverse Fourier transform the sequence in the frequency domain to obtain a time domain signal; and transmit the time domain signal to a second communication device.

The first communication device according to the fifth or sixth aspect can be extended into implementation forms corresponding to the implementation forms of the first communication device according to the first aspect. Hence, an implementation form of the first communication device according to the fifth or sixth aspect can comprise the feature(s) of the corresponding implementation form of the first communication device according to the first aspect.

The advantages of the first communication device according to the fifth or sixth aspect are the same as those for the corresponding implementation forms of the first communication device according to the first aspect.

According to a seventh aspect of the invention, the above mentioned and other objectives are achieved with a second communication device for a communication system, the second communication device being configured to receive a time domain signal in a radio channel from the first communication device, wherein the received time domain signal comprises at least one time domain signal associated with a sequence;

obtain at least one local sequence from a subset of sequences with index q in a set of sequences comprising Q number of subsets of sequences, each subset of sequences comprising A number of orthogonal sequences, and wherein any two sequences from different subsets of sequences are non-orthogonal;

map the local sequence onto a subset of subcarriers in a set of subcarriers to obtain the local sequence in the frequency domain, wherein the set of subcarriers are divided into t number of subbands;

phase rotate the local sequence in the frequency domain based on a constant value $\Delta_q$ to obtain a phase rotated local sequence in the frequency domain, wherein the constant value $\Delta_q$ is dependent on the Q number of subsets of sequences, the t number of subbands and the index q of the subset of sequences;

inverse Fourier transform the phase rotated local sequence in the frequency domain to obtain a local time domain signal; and estimate the radio channel based on the received time domain signal and the local time domain signal.

According to an eighth aspect of the invention, the above mentioned and other objectives are achieved with a second communication device for a communication system, the second communication device being configured to receive a time domain signal in a radio channel from the first communication device, wherein the received time domain signal comprises at least one time domain signal associated with a sequence;

obtain at least one local sequence from a subset of sequences with index q in a set of sequences comprising Q number of subsets of sequences, each subset of sequences comprising A number of orthogonal sequences, wherein any two sequences from different subsets of sequences are non-orthogonal;

map the local sequence onto a subset of subcarriers in a set of subcarriers to obtain the local sequence in the frequency domain, wherein the set of subcarriers are divided into t number of subbands;

inverse Fourier transform the local sequence in the frequency domain to obtain a local time domain signal;

cyclically shift the local time domain signal based on a constant value $\Delta_q$ to obtain a cyclically shifted local time domain signal, wherein the constant value $\Delta_q$ is dependent on the Q number of subsets of sequences, the t number of subbands and the index q of the subset of sequences; and estimate the radio channel based on the received time domain signal and the cyclically shifted local time domain signal.

According to a ninth aspect of the invention, the above mentioned and other objectives are achieved with a second communication device for a communication system, the second communication device being configured to receive a time domain signal in a radio channel from the first communication device, wherein the received time domain signal comprises at least one time domain signal associated with a sequence;

obtain at least one local sequence from a subset of sequences with index q in a set of sequences comprising Q number of subsets of sequences, each subset of sequences in the set of sequences comprising A number of orthogonal sequences, wherein any two sequences from different subsets of sequences are non-orthogonal when each q-th subset of sequences are inversely phase rotated based on a constant value $\Delta_q$;

map the local sequence onto a subset of subcarriers in a set of subcarriers to obtain the local sequence in the frequency domain, wherein the set of subcarriers are divided into t number of subbands;

wherein the constant value $\Delta_q$ is dependent on the Q number of subsets of sequences, the t number of subbands and the index q of the subset of sequences;

inverse Fourier transform the local sequence in the frequency domain to obtain a local time domain signal; and estimate the radio channel based on the received time domain signal and the local time domain signal.

According to a tenth aspect of the invention, the above mentioned and other objectives are achieved with a second communication device for a communication system, the second communication device being configured to receive a time domain signal in a radio channel from the first communication device, wherein the received time domain signal comprises at least one time domain signal associated with a sequence;

Fourier transform the received time domain signal to obtain a sequence in the frequency domain of the received time domain signal;

obtain at least one local sequence from a subset of sequences with index q in a set of sequences comprising Q number of subsets of sequences, each subset of sequences in the set of sequences comprising A number of orthogonal sequences, wherein any two sequences from different subsets of sequences are non-orthogonal when each q-th subset of sequences are inversely phase rotated based on a constant value $\Delta_q$;

map the local sequence onto a subset of subcarriers in a set of subcarriers to obtain the local sequence in the frequency domain, wherein the set of subcarriers are divided into t number of subbands;

wherein the constant value $\Delta_q$ is dependent on the Q number of subsets of sequences, the t number of subbands and the index q of the subset of sequences; and estimate the radio channel based on the local sequence in the frequency domain and the sequence in the frequency domain of the received time domain signal.

The second communication device according to the seventh, eighth, ninth, or tenth aspect can be extended into implementation forms corresponding to the implementation forms of the second communication device according to the second aspect. Hence, an implementation form of the second communication device according to the seventh, eighth, ninth, or tenth aspect can comprise the feature(s) of the corresponding implementation form of the second communication device according to the second aspect.

The advantages of the second communication device according to the seventh, eighth, ninth, or tenth aspect are the same as those for the corresponding implementation forms of the second communication device according to the second aspect.

According to an eleventh aspect of the invention, the above mentioned and other objectives are achieved with a method for a first communication device, the method comprises obtaining at least one sequence from a subset of sequences with index q in a set of sequences comprising Q number of subsets of sequences, each subset of sequences comprising A number of orthogonal sequences, wherein any two sequences from different subsets of sequences are non-orthogonal;

mapping the sequence onto a subset of subcarriers in a set of subcarriers to obtain a sequence in the frequency domain, wherein the set of subcarriers are divided into t number of subbands;

inverse Fourier transforming the sequence in the frequency domain to obtain a time domain signal;

cyclically shifting the time domain signal based on a constant value $\Delta_q$ to obtain a cyclically shifted time domain signal, wherein the constant value $\Delta_q$ is dependent on the Q number of subsets of sequences, the t number of subbands and the index q of the subset of sequences; and transmitting the cyclically shifted time domain signal to a second communication device.

According to a twelfth aspect of the invention, the above mentioned and other objectives are achieved with a method for a first communication device, the method comprises obtaining at least one sequence from a subset of sequences with index q in a set of sequences comprising Q number of subsets of sequences, each subset of sequences in the set of sequences comprising A number of orthogonal sequences, wherein any two sequences from different subsets of sequences are non-orthogonal when each q-th subset of sequences are inversely phase rotated based on a constant value $\Delta_q$;

mapping the sequence onto a subset of subcarriers in a set of subcarriers to obtain a sequence in the frequency domain, wherein the set of subcarriers are divided into t number of subbands;

wherein the constant value $\Delta_q$ is dependent on the Q number of subsets of sequences, the t number of subbands and the index q of the subset of sequences;

inverse Fourier transforming the sequence in the frequency domain to obtain a time domain signal; and transmitting the time domain signal to a second communication device.

The method according to the eleventh or twelfth aspect can be extended into implementation forms corresponding to the implementation forms of the first communication device according to the fifth or sixth aspect, respectively. Hence, an implementation form of the method comprises the feature(s) of the corresponding implementation form of the first communication device.

The advantages of the methods according to the eleventh or twelfth aspect are the same as those for the corresponding implementation forms of the first communication device according to the fifth or sixth aspect, respectively.

According to a thirteenth aspect of the invention, the above mentioned and other objectives are achieved with a method for a second communication device, the method comprises receiving a time domain signal in a radio channel from the first communication device, wherein the received time domain signal comprises at least one time domain signal associated with a sequence;

obtaining at least one local sequence from a subset of sequences with index q in a set of sequences comprising Q number of subsets of sequences, each subset of sequences comprising A number of orthogonal sequences, and wherein any two sequences from different subsets of sequences are non-orthogonal;

mapping the local sequence onto a subset of subcarriers in a set of subcarriers to obtain the local sequence in the frequency domain, wherein the set of subcarriers are divided into t number of subbands;

phase rotating the local sequence in the frequency domain based on a constant value $\Delta_q$ to obtain a phase rotated local sequence in the frequency domain, wherein the constant value $\Delta_q$ is dependent on the Q number of subsets of sequences, the t number of subbands and the index q of the subset of sequences;

inverse Fourier transforming the phase rotated local sequence in the frequency domain to obtain a local time domain signal; and estimating the radio channel based on the received time domain signal and the local time domain signal.

According to a fourteenth aspect of the invention, the above mentioned and other objectives are achieved with a method for a second communication device, the method comprises receiving a time domain signal in a radio channel from the first communication device, wherein the received time domain signal comprises at least one time domain signal associated with a sequence;

obtaining at least one local sequence from a subset of sequences with index q in a set of sequences comprising Q number of subsets of sequences, each subset of sequences comprising A number of orthogonal sequences, wherein any two sequences from different subsets of sequences are non-orthogonal;

mapping the local sequence onto a subset of subcarriers in a set of subcarriers to obtain the local sequence in the frequency domain, wherein the set of subcarriers are divided into t number of subbands;

inverse Fourier transforming the local sequence in the frequency domain to obtain a local time domain signal;

cyclically shifting the local time domain signal based on a constant value $\Delta_q$ to obtain a cyclically shifted local time domain signal, wherein the constant value $\Delta_q$ is dependent on the Q number of subsets of sequences, the t number of subbands and the index q of the subset of sequences; and estimating the radio channel based on the received time domain signal and the cyclically shifted local time domain signal.

According to a fifteenth aspect of the invention, the above mentioned and other objectives are achieved with a method for a second communication device, the method comprises receiving a time domain signal in a radio channel from the first communication device, wherein the received time domain signal comprises at least one time domain signal associated with a sequence;

obtaining at least one local sequence from a subset of sequences with index q in a set of sequences comprising Q number of subsets of sequences, each subset of sequences in the set of sequences comprising A number of orthogonal sequences, wherein any two sequences from different subsets of sequences are non-orthogonal when each q-th subset of sequences are inversely phase rotated based on a constant value $\Delta_q$;

mapping the local sequence onto a subset of subcarriers in a set of subcarriers to obtain the local sequence in the frequency domain, wherein the set of subcarriers are divided into t number of subbands;

wherein the constant value $\Delta_q$ is dependent on the Q number of subsets of sequences, the t number of subbands and the index q of the subset of sequences;

inverse Fourier transforming the local sequence in the frequency domain to obtain a local time domain signal; and estimating the radio channel based on the received time domain signal and the local time domain signal.

According to a sixteenth aspect of the invention, the above mentioned and other objectives are achieved with a method for a second communication device, the method comprises receiving a time domain signal in a radio channel from the first communication device, wherein the received time domain signal comprises at least one time domain signal associated with a sequence;

Fourier transforming the received time domain signal to obtain a sequence in the frequency domain of the received time domain signal;

obtaining at least one local sequence from a subset of sequences with index q in a set of sequences comprising Q number of subsets of sequences, each subset of sequences in the set of sequences comprising A number of orthogonal sequences, wherein any two sequences from different subsets of sequences are non-orthogonal when each q-th subset of sequences are inversely phase rotated based on a constant value $\Delta_q$;

mapping the local sequence onto a subset of subcarriers in a set of subcarriers to obtain the local sequence in the frequency domain, wherein the set of subcarriers are divided into t number of subbands;

wherein the constant value $\Delta_q$ is dependent on the Q number of subsets of sequences, the t number of subbands and the index q of the subset of sequences; and estimating the radio channel based on the local sequence in the frequency domain and the sequence in the frequency domain of the received time domain signal.

The method according to the thirteenth, fourteenth, fifteenth, or sixteenth aspect can be extended into implementation forms corresponding to the implementation forms of the second communication device according to the seventh, eighth, ninth, and tenth aspect, respectively. Hence, an implementation form of the method comprises the feature(s) of the corresponding implementation form of the second communication device.

The advantages of the methods according to the thirteenth, fourteenth, fifteenth, or sixteenth aspect are the same as those for the corresponding implementation forms of the second communication device according to the seventh, eighth, ninth, and tenth aspect, respectively.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different examples of the invention, in which.

DETAILED DESCRIPTION

Figure 1:
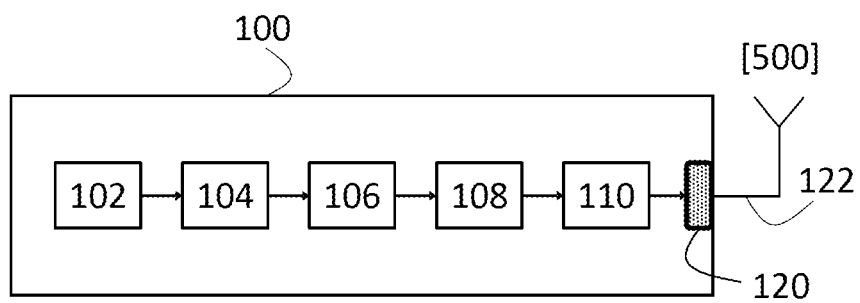
FIG. 1 shows a first communication device according to an example of the invention.

The propagation CIR estimation based on SRS transmission is based on periodic cross correlation of the received signal with a reference signal in the receiver. The reference signal $s^*(k)$, $k=0, 1, \ldots, N-1$, is the complex-conjugate version of SRS, where "*" denotes complex conjugation.

At the transmitter the SRS is extended by a preamble signal $s_{cp}(l)=s(N-1-(D-1-l))$, $l=0, 1, \ldots, D-1$ of D samples, equal to the last $D \leq N$ samples of the SRS. In systems using orthogonal frequency division multiplex (OFDM) waveforms, the preamble $\{s_{cp}(l)\}$ is called the cyclic prefix (CP). The detection time window $D_W$ is not supposed to be larger than the CP length D and could be smaller, if the receiver knows that the delay spread of propagation channel is smaller than the CP. In some transmission schemes, the SRS is also extended by a postamble signal, of the same size as the CP, but being equal to the first D samples of the SRS.

The received signal r(k) is convolution of the transmitted signal (concatenated CP and SRS) and the propagation channel impulse response h(l), $l=0, 1, \ldots, C-1$. If the CP length is such that $D \geq C-1$, the samples of the received SRS signal can be rewritten as circular convolution between $\{s(k)\}$ and $\{h(l)\}$, i.e., $$r(k)=\Sigma_{l=0}^{C-1}h(l)s((k-l) \bmod N), k=0,1,\ldots,N-1. \quad (1)$$

The transmission of the SRS is synchronized with timing of the receiver through the so-called TA mechanism at the transmitter based on the feedback from the receiver, so that the time of arrival (TOA) of the earliest received replica of the SRS corresponds to the position of the first sample (r(0)) in the first block of N received signal samples correlated in the matched filter. It means that the matched filter always starts its operation at a delay p=0.

Therefore the operation of the matched filter can be described as calculation of the D values of the periodic cross-correlation $\theta_{rs}(p)$, $p=0, 1, \ldots, D-1$, between the reference signal $s^*(k)$, $k=0, 1, \ldots, N-1$, and D overlapping blocks $r(k+p)$ of the received signal. Mathematically $\theta_{rs}(p)$ can be described as $$\theta_{rs}(p)=\Sigma_{k=0}^{N-1}s^*(k)r(k+p)$$

$$=\Sigma_{l=0}^{C-1}h(l)\Sigma_{k=0}^{N-1}s^*(k)s(k-l+p)$$

$$=\Sigma_{l=0}^{C-1}h(l)\theta_{ss}(p-l), p=0,1,\ldots,D-1 \quad (2)$$

where $\theta_{ss}(\tau)$, $\tau=0, 1, \ldots, N-1$, is the periodic autocorrelation of the SRS.

Let us suppose now that the periodic autocorrelation function $\theta_{ss}(\tau)$ of the SRS has a ZAZ of length $D_{ZAZ}$ defined as $$\theta_{ss}(\tau)\begin{cases} = 0, |\tau| = 1, 2, \ldots, D_{ZAZ} \\ \neq 0, |\tau| > D_{ZAZ} \end{cases} \quad (3)$$

such that $$C-1 \leq D_{ZAZ} \leq D-1. \quad (4)$$

From (2)-(4) it follows that $$\theta_{rs}(l) = \begin{cases} h(l)\theta_{ss}(0) & l = 0, 1, \ldots, C-1 \\ 0 & l = C, C+1, \ldots, D_{ZAZ} \end{cases} \quad (5)$$

In case of multiple SRSs transmitted in parallel, the aforementioned TA mechanism will result in aligned TOAs of their earliest received replicas at the BS. Under that condition it is expected that the CIR estimation at the matched filter output of one SRS does not suffer interference from any other concurrently transmitted SRS. As before, let r(k) denote the samples of the received signal from one SRS, e.g. $s_x(k)$, k=0, 1, ..., N−1, while use the reference signal corresponding to another SRS, e.g. $s_y(k)$ to perform matched filtering. The matched filter output is then given by $$\theta_{r_x s_y}(p) = \Sigma_{l=0}^{C-1} h(l) \theta_{s_x s_y}(p-l), p=0,1,\ldots,D-1. \quad (6)$$

Let us suppose that the periodic cross correlation function $\theta_{s_x s_y}$ of two SRSs has a ZCCZ of length $D_{ZCCZ}$, defined as $$\theta_{s_x s_y}(\tau) \begin{cases} = 0, |\tau| = 0, 1, \ldots, D_{ZCCZ} \\ \neq 0, |\tau| > D_{ZCCZ} \end{cases} \quad (7)$$

such that $$C-1 \leq D_{ZCCZ} \leq D-1 \quad (8)$$

From (6)-(8) it follows that $\theta_{r_x s_y}(\tau)=0$, $\tau=0, 1, \ldots, D_{ZCCZ}$. Thus, as long as the detection time window $D_W \leq D$ is such that $$D_W = D_{ZCZ} + 1 \quad (9)$$

where $D_{ZCZ} = \min\{D_{ZAZ}, D_{ZCCZ}\}$ is the length of zero correlation zone (ZCZ), the CIR of the propagation channel experienced by the SRS $s_y(k)$ can be estimated without any interference from the simultaneously received SRS $s_x(k)$ having the same $D_{ZAZ}$. The upper bound of $D_{ZCZ}$ for the set of M complex signals of length N is given by $$D_{ZCZ} \leq \frac{N}{M} - 1. \quad (10)$$

The estimated CIR is then converted to the frequency domain via DFT to obtain the estimated channel coefficient at each subcarrier and each BS antenna for use in the subsequent DL data transmission.

In a first conventional solution, a class of "semi-perfect" binary sequences are proposed as midamble sequences for CIR estimation in the GSM mobile communication systems with BPSK, MSK-type, QPSK and offset-QPSK modulation. The proposed semi-perfect sequences can have any length of form $N=2^k$ with k being a positive integer and are constructed recursively from shorter semi-perfect sequence pairs of length N'=N/2. The total number of sequences that can be generated is $(k-2)! \ 2^{k-1}$. It is proved that these sequences have a ZAZ of length N/4−1 in their periodic autocorrelation functions, and a ZCCZ of length N/4−1 in the periodic cross-correlation function of each pair.

In a second conventional solution, the SRS is constructed based on OFDM modulation, as a signal consisting of a sum of N complex sinusoids whose frequencies are consecutive integer multiples of a constant. The complex sinusoids are often called subcarriers and the constant is referred to as subcarrier spacing (SCS). Each sinusoid is multiplied, i.e. modulated by a complex number. These complex numbers can be ordered onto a sequence, often called a frequency-domain modulation sequence. The SRS frequency-domain modulation sequences are Zadoff-Chu (ZC) sequences of a certain root indices and lengths, with periodical extensions according to the available SRS bandwidth. A ZC sequence {a(u)} of length L is defined as $$a(u) = W_L^{\alpha u(u+L \bmod 2 + 2q)/2}, u=0,1,\ldots,L-1 \quad (11)$$

where $W_L = \exp(-\sqrt{-1} \ 2\pi/L)$, $\alpha \neq 0$ and q are integers, and $\alpha$, which is called root index, is relatively prime to L.

There are 30 ZC root indices defined. For a given root index of the ZC sequence, a generic SRS is obtained by using the elements of the corresponding generic ZC sequence to modulate every $K_{TC}$-th subcarrier ($K_{TC}=2$, or 4, or 8, referred to as Comb-2, Comb-4 and Comb-8 frequency resources, respectively), and then summing all the subcarriers. The modulation and summing of subcarriers can be efficiently done through IDFT. Obviously, there are $K_{TC}=2$, or 4, or 8 possible starting frequency positions for mapping the generic ZC sequence.

Such generic SRS is then used to generate a group of A number of orthogonal SRS s, having certain ZAZ and ZCCZ in their periodic correlation functions, by A (=8, or 12, or 6) equidistant cyclic shifts of the basic SRS. The cyclic shifts of the basic SRS can be implemented by the corresponding phase offsets of the basic ZC sequence. Such group of A orthogonal SRSs can be generated for each possible starting frequency position. Thus, the total number of orthogonal SRSs for each type of frequency resources is as follows: for Comb-2 there are 16 ($K_{TC}=2 \times A=16$ with A=8) orthogonal SRSs; for Comb-4 there are 48 ($K_{T-c}=4 \times A=48$ with A=12) orthogonal SRSs; and for Comb-8 there are 48 ($K_{TC}=8 \times A=48$ with A=6) orthogonal SRSs.

The corresponding zero correlation zones of length $D_{ZCZ}=\min\{D_{ZAZ}, D_{ZCCZ}\}$ are given by $$D_{ZCZ} = \frac{N}{8(\text{cyclic shifts}) \times 2(\text{initial locations})} - 1 = N/16 - 1 \quad \text{(Comb-2)}$$

$$D_{ZCZ} = \frac{N}{12(\text{cyclic shifts}) \times 4(\text{initial locations})} - 1 = N/48 - 1 \quad \text{(Comb-4)}$$

$$D_{ZCZ} = \frac{N}{6(\text{cyclic shifts}) \times 8(\text{initial locations})} - 1 = N/48 - 1 \quad \text{(Comb-8)}$$

Each SRS is extended by a cyclic prefix as described earlier, to obtain a SRS OFDM symbol. Multiple SRS OFDM symbols, e.g. 1, 2, 4, 8 or 12 OFDM symbols, can be transmitted consecutively, i.e. repeated at a certain antenna port.

A third conventional solution disclose the generation of UL random access (RACH) preambles proposed for the new radio (NR) unlicensed spectrum. Although the RACH preambles have different purpose (i.e. for synchronization) and design requirements than SRSs (i.e. for channel estimation), the RACH preambles are considered relevant, due to certain correlation properties and frequency resource allocation of the proposed RACH preambles. These frequency resources are allowed to be defined more flexibly than in the above described conventional solutions: the whole band of $N=\delta t$ subcarriers, with $\delta$ and t being positive integers, is divided into t subbands of S consecutive subcarriers. The same $A_{SC}$ ($A_{SC} \leq \delta$) number of subcarriers is selected in each subband to be used for transmission. Each of such $A_{SC}$ number of subcarriers are modulated by $A=A_{SC}$ orthogonal or quasi-orthogonal sequences to produce A RACH preambles having certain ZAZ and ZCCZ in their periodic correlation functions.

The inventors have identified a number of drawbacks of the conventional solutions. The drawback of the first conventional solution is that according to equation (10) the number M of proposed midamble sequences that might have the zero correlation zone of length $D_{ZCZ}=N/4-1$ is theoretically limited to 4.

The drawback of the second conventional solution is that it has a limited SRS capacity per cell in case of a high mobility system, where a UE needs to transmit SRS with shortest repetition period T to track the channel variation over time due to UE mobility. As mentioned previously, the second conventional solution can support at most 16 or 48 orthogonal and simultaneous SRS transmissions over a given time-frequency resource per cell. If additional simultaneously active UEs have to be supported, their SRS transmission timing could be delayed by some time offset $T_{offset}$ within deployed SRS period T, so that they can reuse without any interference the SRSs already allocated to other UEs. Possible time offsets depend on the value of T.

In the second conventional solution, the SRS period T (called periodicity $T_{SRS}$ in the second conventional solution) and the corresponding possible time offsets $T_{offset}$ are expressed in slots, not in absolute time because slots have different durations in NR for different subcarrier spacing, as shown in the following table:

| Subcarrier spacing (kHz) | Duration of one slot (ms) |
|---|---|
| 15 | 1 |
| 30 | 0.5 |
| 60 | 0.25 |
| 120 | 0.125 |
| 240 | 0.0625 |

If the SRS period is N slots then there are N−1 possible time offsets within that period. The minimum SRS period T is only one slot duration, so there is no corresponding time offset. In that case, supporting additional orthogonal SRS transmissions by time division multiplex (TDM) of reused SRSs is only possible if the SRS period is doubled. However, doubling the SRS period results in significant mismatch between the CIRs experienced by UL SRS and DL data.

The second conventional solution also allows an alternative solution, by giving up the SRS orthogonality and allowing SRSs generated by different ZC root indices to be transmitted concurrently in the same cell. This brings significantly increased interference over the whole CIR detection window, primarily from intra-cell UEs, but also to some extent from inter-cell UEs, as the SRS reuse factor in the system is reduced due to a less number of supported cells (this second source of interference can be easily eliminated by increasing the subset of root indices specified in the standard). Consequently, in both these two approaches, the precoder for DL data transmission designed based on estimated UL CIR does not match well the CIR experienced by DL data, causing significant performance degradation for DL data transmission.

The drawback of the third conventional solution is similar to that of the second conventional solution, i.e. it does not disclose how to generate non-orthogonal SRSs and how to handle interference between non-orthogonal SRSs.

Consequently, there is a need for a solution which address the above mentioned drawbacks. An objective of the invention is therefore to provide a solution that increases the number of reference signals that can be transmitted simultaneously while minimizing the interference such that the channel estimation performances can be improved.

Embodiments of the invention discloses a reference signal design which can be used e.g. for UL SRS design for OFDM based mMIMO wireless communication systems but is not limited thereto. The reference signal design explores a special property, the sparsity, of the pairwise cross correlation of non-orthogonal block-interlaced frequency domain multiple access (B-IFDMA) signals. The sparsity of the pairwise cross correlation can be defined as a property that the cross correlation is non-zero only for a set of delays that are multiples of a certain delay offset, such that it is significantly larger than 1 and it is a factor of the SRS duration.

Embodiments of the invention can utilize the fact that the timing of all UL signals is tightly controlled by the base station by so-called TA mechanism, resulting in simultaneous arrival of earliest replicas of all UL SRSs at the BS. By simple manipulations of different non-orthogonal B-IFDM signals, it is achieved that the sparse pairwise interference caused by the cross correlation of a non-orthogonal SRS appears only between the tail of the CIR experienced by one SRS and the head of the CIR experienced by another SRS. Thereby, the head of the CIR, where typically the strongest and thus most important CIR components lay, only suffers marginal interference from the other non-orthogonal SRSs, even if the number of concurrently transmitted new SRSs per cell is doubled compared to the corresponding conventional SRSs in 3GPP NR. It is however noted that embodiments of the invention can be implemented in the downlink, in sidelink or any other suitable communication link.

FIG. 1 shows a first communication device 100 according to an embodiment of the invention. In the embodiment shown in FIG. 1, the first communication device 100 comprises an obtaining block 102, a mapping block 104, a phase rotating block 106, an inverse Fourier transforming block 108, and a transmitting block 110 coupled to each other.

The obtaining block 102 is configured to obtain at least one sequence from a subset of sequences with index q in a set of sequences. The set of sequences comprises Q number of subsets of sequences and each subset of sequences comprising A number of orthogonal sequences. Furthermore, any two sequences from different subsets of sequences are non-orthogonal.

In embodiments, the obtaining block 102 may obtain two or more sequences, wherein the two or more sequences are from the same subset of sequences. The obtained two or more sequences are then used to generated two or more time domain signals and transmitted from different antenna ports of the first communication device. By generating the two or more time domain signals based on the two or more sequence from the same subset of sequence, a ZCCZ can be maintained between them whose length/time span can be as long as that of their ZAZ. Thereby, minimized interference between the two or more time domain signals at the second communication device can be achieved during the estimation of their correspondingly experienced propagation channels.

The mapping block 104 is configured to map the sequence from the subset of sequences onto a subset of subcarriers in a set of subcarriers to obtain a sequence in the frequency domain. The set of subcarriers are divided into t number of subbands. In embodiments, the number of subcarriers in the subset of subcarriers is equal to the length of the sequence. The mapping block 104 may then be configured to map each element of the sequence onto each subcarrier in the subset of subcarriers. Each element of the sequence can be mapped onto each subcarrier in the subset of subcarriers in either ascending or descending order. For example, the kth element of the sequence can be mapped onto the kth subcarrier in the subset of subcarriers, where k=0, 1, 2, etc. and the subcarriers in the subset of subcarriers can be indexed either from the lowest frequency to the highest frequency, or vice versa.

The subset of subcarriers may comprise $A_{SC}$ number of subcarriers in each of the t number of subbands. The distribution of the $A_{SC}$ number of subcarriers may be the same in all the t number of subbands, and the $A_{SC}$ number of subcarriers in each subband may be equal to the A number of orthogonal sequences in each subset of sequences, i.e.

$A_{SC}=A$. The distribution of the $A_{SC}$ number of subcarriers in each subband may be consecutive or non-consecutive. Furthermore, the distribution of the $A_{SC}$ number of subcarriers in each subband may be uniform or non-uniform. In this way, the distribution of all the subcarriers in the subset of subcarriers may be mapped to possible distributions of subcarriers in the set of subcarriers in frequency domain according to the 3GPP standard.

The phase rotating block 106 is configured to phase rotate the sequence in the frequency domain based on a constant value $\Delta_q$ to obtain a phase rotated sequence in the frequency domain. The constant value $\Delta_q$ is dependent on the Q number of subsets of sequences, the t number of subbands and the index q of the subset of sequences.

By phase rotating the sequence based on the constant value $\Delta_q$ a predetermined cyclic shift in the time domain can be achieved for the sequence which is subset specific.

In embodiments, the constant value $\Delta_q$ is a positive integer and determined according to any of the formulas $$\Delta_q = q \lfloor t/Q \rfloor, q=0,1,\ldots Q-1, \text{ or}$$

$$\Delta_q = \lfloor qt/Q \rfloor, q=0,1,\ldots,Q-1$$

where $\lfloor \ldots \rfloor$ is the flooring-operator.

The inverse Fourier transforming block 108 is configured to inverse Fourier transform the phase rotated sequence in the frequency domain to obtain a time domain signal. The time domain signal may be a reference signal such as e.g. a sounding reference signal (SRS). Due to the phase rotation performed by the phase rotating block 106, the ZCCZ property between the time domain signals generated based on sequences from different subsets of sequences in the set of sequences can be guaranteed, where the ZCCZ length/time span is dependent on the subset specific constant value $\Delta_q$.

The transmitting block 110 is configured to transmit the time domain signal to a second communication device 300. The transmitting block 110 may transmit the time domain signal using a transceiver of the first communication device 100, such as the transceiver 120 shown in FIG. 1. With reference to FIG. 1, the transceiver 120 may be coupled to an antenna or antenna array 122, which means that the first communication device 100 may be configured for wireless communications in a communication system 500.

The obtaining block 102, the mapping block 104, the phase rotating block 106, and the inverse Fourier transforming block 108 may be implemented in a processor(s) (not shown in the Figs. of the disclosure) of the first communication device 100 such that the processor is configured to execute the actions or corresponding steps and functions performed and illustrated by the obtaining block 102, the mapping block 104, the phase rotating block 106, and the inverse Fourier transforming block 108 in FIG. 1. The obtaining block 102, the mapping block 104, the phase rotating block 106, and the inverse Fourier transforming block 108 could for example represent different sections of a program code running on the processor.

In a similar way, the transmitting block 110 may be implemented in a transceiver 120 of the first communication device 100, such that the transceiver 120 is configured to execute the actions or corresponding steps and functions performed and illustrated by the transmitting block 110 in FIG. 1.

However, the obtaining block 102, the mapping block 104, the phase rotating block 106, the inverse Fourier transforming block 108, and the transmitting block 110 may be implemented in a processor system (not shown) comprising one or more processors coupled to an input and an output.

Figure 2:
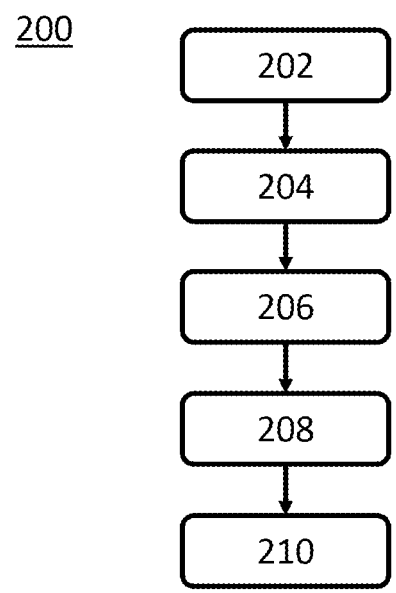
FIG. 2 shows a method for a first communication device according to an example of the invention.

FIG. 2 shows a flow chart of a corresponding method 200 which may be executed in a first communication device 100, such as the one shown in FIG. 1. The method 200 comprises obtaining 202 at least one sequence from a subset of sequences with index q in a set of sequences, wherein the set of sequences comprises Q number of subsets of sequences, each subset of sequences comprising A number of orthogonal sequences, and wherein any two sequences from different subsets of sequences are non-orthogonal. The method 200 further comprises mapping 204 the sequence from the subset of sequences onto a subset of subcarriers in a set of subcarriers to obtain a sequence in the frequency domain, wherein the set of subcarriers are divided into t number of subbands. The method 200 further comprises phase rotating 206 the sequence in the frequency domain based on a constant value $\Delta_q$ to obtain a phase rotated sequence in the frequency domain, wherein the constant value $\Delta_q$ is dependent on the Q number of subsets of sequences, the t number of subbands and the index q of the subset of sequences. Furthermore, the method 200 comprises inverse Fourier transforming 208 the phase rotated sequence in the frequency domain to obtain a time domain signal; and transmitting 210 the time domain signal to a second communication device 300.

Figure 3:
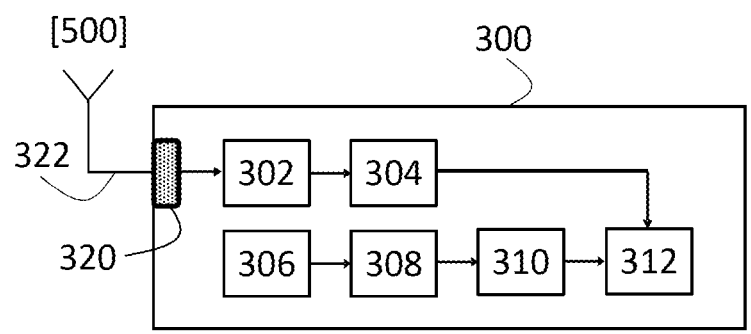
FIG. 3 shows a second communication device according to an example of the invention.

FIG. 3 shows a second communication device 300 according to an embodiment of the invention. In the embodiment shown in FIG. 3, the second communication device 300 comprises a receiving block 302, a Fourier transforming block 304, an obtaining block 306, a mapping block 308, a phase rotating block 310, and an estimating block 312 coupled to each other.

The receiving block 302 is configured to receive a time domain signal in a radio channel from the first communication device 100. The received time domain signal is associated with a sequence. In embodiments, the received time domain signal may comprise a time domain signal associated with a sequence, wherein the time domain signal comprised in the received time domain signal may be a reference signal such as e.g. a sounding reference signal (SRS).

The receiving block 302 may receive the time domain signal using a transceiver, such as the transceiver 320 shown in FIG. 3. With reference to FIG. 3, the transceiver 320 may be coupled to an antenna or antenna array 322, which means that the second communication device 300 may be configured for wireless communications in a communication system 500.

The Fourier transforming block 304 is configured to Fourier transform the received time domain signal to obtain the sequence in the frequency domain of the received time domain signal.

The obtaining block 306 is configured to obtain at least one local sequence from a subset of sequences with index q in a set of sequences comprising Q number of subsets of sequences. Each subset of sequences comprising A number of orthogonal sequences and any two sequences from different subsets of sequences are non-orthogonal. A local sequence can be understood to mean a sequence which is obtained locally in the second communication device 300 and not received by the second communication device 300 e.g. from the first communication device 100. In embodiments, the obtaining block 306 may obtain two or more local sequences, wherein the two or more local sequences can be from the same or different subsets of sequences.

The mapping block 308 is configured to map the local sequence onto a subset of subcarriers in a set of subcarriers to obtain the local sequence in the frequency domain. The set of subcarriers are divided into t number of subbands. In a similar way as described above for the first communication device 100, the number of subcarriers in the subset of subcarriers may in embodiments be equal to the length of the sequence. The mapping block 307 may then be configured to map each element of the sequence onto each subcarrier in the subset of subcarriers. Each element of the sequence can be mapped onto each subcarrier in the subset of subcarriers in either ascending or descending order. For example, the kth element of the sequence can be mapped onto the kth subcarrier in the subset of subcarriers, where k=0, 1, 2, etc. and the subcarriers in the subset of subcarriers can be indexed either from the lowest frequency to the highest frequency, or vice versa.

Furthermore, the subset of subcarriers may comprise $A_{SC}$ number of subcarriers in each of the t number of subbands. The distribution of the $A_{SC}$ number of subcarriers may be the same in all the t number of subbands, and the $A_{SC}$ number of subcarriers in each subband may be equal to the A number of orthogonal sequences in each subset of sequences, i.e. $A_{SC}$=A. The distribution of the $A_{SC}$ number of subcarriers in each subband may e.g. be consecutive or non-consecutive. Furthermore, the distribution of the $A_{SC}$ number of subcarriers in each subband may be uniform or non-uniform. In this way, the distribution of all the subcarriers in the subset of subcarriers may be mapped to possible distributions of subcarriers in the set of subcarriers in frequency domain according to the 3GPP standard.

The phase rotating block 310 is configured to phase rotate the local sequence in the frequency domain based on a constant value $\Delta_q$ to obtain a phase rotated local sequence in the frequency domain, wherein the constant value $\Delta_q$ is dependent on the Q number of subsets of sequences, the t number of subbands and the index q of the subset of sequences. By phase rotating the local sequence based on the constant value $\Delta_q$ a predetermined cyclic shift in the time domain can be achieved for the local sequence which is subset specific.

In embodiments, the constant value $\Delta_q$ is a positive integer and determined according to any of the formulas $\Delta_q = q \lfloor t/Q \rfloor$, $q=0,1,\ldots,Q-1$, or $\Delta_q = \lfloor qt/Q \rfloor$, $q=0,1,\ldots,Q-1$ where $\lfloor \ldots \rfloor$ is the flooring-operator.

The estimating block 312 is configured to estimate the radio channel based on the phase rotated local sequence in the frequency domain and the sequence in the frequency domain of the received time domain signal, i.e. based on the outputs of the Fourier transforming block 304 and the phase rotating block 310. Estimate the radio channel can comprise estimate the channel impulse response in the time domain or the channel coefficient of each subcarrier in the set of subcarriers in the frequency domain.

The Fourier transforming block 304, the obtaining block 306, the mapping block 308, the phase rotating block 310, and the estimating block 312 may be implemented in a processor(s) (not shown in the Figs. of the disclosure) of the second communication device 300 such that the processor is configured to execute the actions or corresponding steps and functions performed and illustrated by the Fourier transforming block 304, the obtaining block 306, the mapping block 308, the phase rotating block 310, and the estimating block 312 in FIG. 3. The Fourier transforming block 304, the obtaining block 306, the mapping block 308, the phase rotating block 310, and the estimating block 312 could for example represent different sections of a program code running on the processor.

In a similar way, the receiving block 302 may be implemented in a transceiver 320 of the second communication device 300, such that the transceiver 320 is configured to execute the actions or corresponding steps and functions performed and illustrated by the receiving block 302 in FIG. 3.

However, the receiving block 302, the Fourier transforming block 304, the obtaining block 306, the mapping block 308, the phase rotating block 310, and the estimating block 312 may be implemented in a processor system (not shown) comprising one or more processors coupled to an input and an output.

Figure 4:
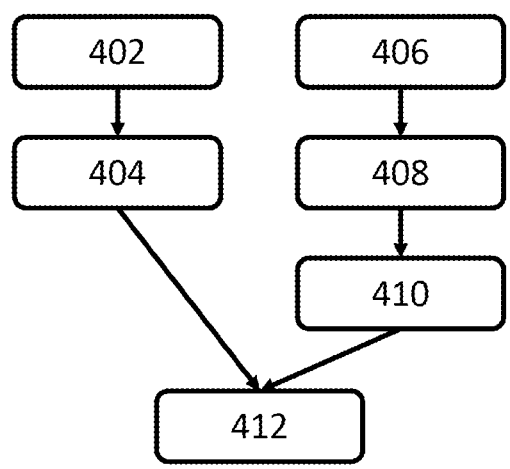
FIG. 4 shows a method for a second communication device according to an example of the invention.

FIG. 4 shows a flow chart of a corresponding method 400 which may be executed in a second communication device 300, such as the one shown in FIG. 3. The method 400 comprises receiving 402 a time domain signal in a radio channel from the first communication device 100, wherein the received time domain signal is associated with a sequence, and Fourier transforming 404 the received time domain signal to obtain the sequence in the frequency domain of the received time domain signal. That the received time domain signal is associated with a sequence can mean that the received time domain signal comprises at least one time domain signal associated with a sequence, wherein the time domain signal comprised in the received time domain signal is generated based on the sequence at a first communication device 100 and transmitted from the first communication device 100. The method 400 further comprises obtaining 406 at least one local sequence from a subset of sequences with index q in a set of sequences comprising Q number of subsets of sequences, each subset of sequences comprising A number of orthogonal sequences, and wherein any two sequences from different subsets of sequences are non-orthogonal. The method 400 further comprises mapping 408 the local sequence onto a subset of subcarriers in a set of subcarriers to obtain the local sequence in the frequency domain, wherein the set of subcarriers are divided into t number of subbands. The method 400 further comprises phase rotating 410 the local sequence in the frequency domain based on a constant value $\Delta_q$ to obtain a phase rotated local sequence in the frequency domain, wherein the constant value $\Delta_q$ is dependent on the Q number of subsets of sequences, the t number of subbands and the index q of the subset of sequences. Furthermore, the method 400 comprises estimating 412 the radio channel based on the phase rotated local sequence in the frequency domain obtained in the phase rotating 410 method step and the sequence in the frequency domain of the received time domain signal obtained in the Fourier transforming 404 method step.

Figure 5:
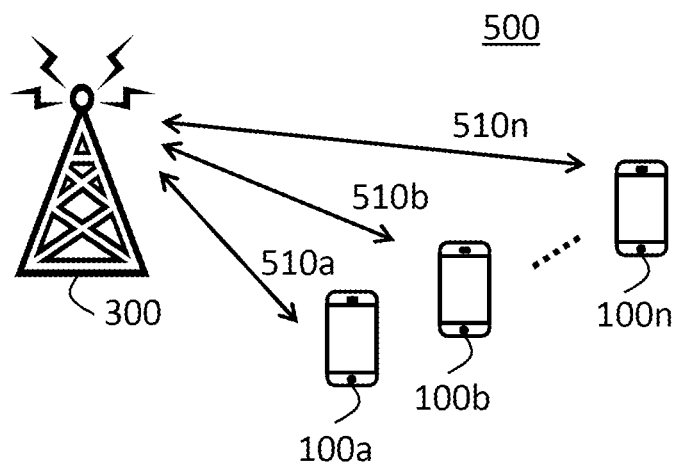
FIG. 5 shows a wireless communication system according to an example of the invention.

FIG. 5 shows a communication system 500 according to an embodiment of the invention. The communication system 500 comprises multiple first communication devices 100a, 100b, . . . , 100n and a second communication device 300 configured to operate in the communication system 500. In the embodiment shown in FIG. 5, the first communication devices 100a, 100b, . . . , 100n may be client devices which may also be denoted user equipment (UE) devices and the second communication device 300 may be a network access node such as e.g. a base station in a radio access network (RAN).

The first communication devices 100a, 100b, . . . , 100n may be configured to transmit reference signals to the second communication device 300. Each of the transmitted reference signals is obtained based on a sequence as described above with reference to FIG. 1. Based on the received reference signal, the second communication device 300 may estimate the quality of radio channels 510a, 510b, . . . , 510n experienced by the time domain signals transmitted from the first communication devices 100a, 100b, . . . , 100n, respectively.

Figure 6:
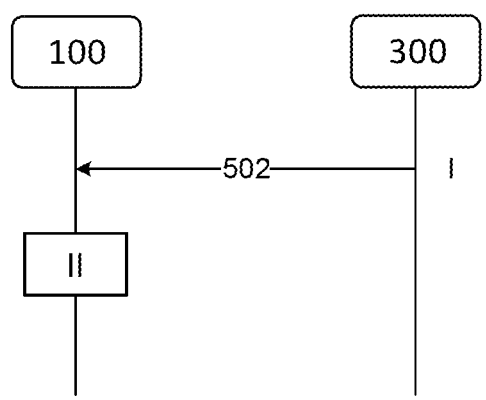
FIG. 6 shows signaling between a first communication device and a second communication device according to an example of the invention.

According to embodiments of the invention the first communication device 100 may obtain the sequence used to determine the time domain signal further based on information provided by the second communication device 300. FIG. 6 shows the signaling between the first communication device 100 and the second communication device 300 according to such an embodiment.

In step I in FIG. 6, the second communication device 300 provides a control message 502 to the first communication device 100, the control message 502 comprises at least one parameter indicating the sequence. The second communication device 300 may e.g. transmit the control message 502 to the first communication device 100.

The first communication device 100 obtains, e.g. receives, the control message 502 comprising the at least one parameter indicating the sequence from the second communication devices 300. Based on the control message 502, the first communication device 100 obtains the sequence in step II in FIG. 6. Step II may comprise the first communication device 100 obtaining the at least one parameter indicating the sequence from the control message 502 and obtaining the sequence based on the at least one parameter indicating the sequence.

In embodiments, the control message 502 may comprise a first parameter indicating an index of the sequence in a superset of sequences for the communication system 500, where the superset of sequences defined for the whole communication system 500 comprising multiple cells may be divided into multiple sets of sequences for use in different cells of the communication system 500. The control message 502 may comprise a first parameter indicating an index of the set of sequences in a superset of sequences for the communication system 500 and a second parameter indicating an index of the sequence in the set of sequences. Or the control message 502 may comprise a first parameter indicating an index of the set of sequences in a superset of sequences for the communication system 500, a second parameter indicating an index of the subset of sequences in the set of sequences and a third parameter indicating an index of the sequence in the subset of sequences. Thus, the first communication device 100 may in embodiments obtain the sequence based on at least one of the first parameter, the second parameter, and the third parameter.

In embodiments where the first communication device 100 may obtain two or more sequences, the second communication device 300 may provide, e.g. transmit, a control message 502 to the first communication device 100 to indicate the two or more sequences, wherein the two or more sequences are from the same subset of sequences. The control message 502 may in this case comprise at least two parameters indicating the two or more sequences. The two or more sequences may be indicated separately or jointly. When the two or more sequences are indicated separately, each sequence may be indicated as described above with a distinct set of parameters each comprising a first parameter, a first parameter and a second parameter, or a first, second and third parameters. When the two or more sequences are indicated jointly, one first parameter may be used to indicate their common index of the set of sequence, and at least two second parameters may be used to indicate their respective indices in the set of sequences. In a further example, one first parameter may be used to indicate their common index of the set of sequence, one second parameter may be used to indicate their common index of the subset of sequence in the set of sequences, and at least two third parameters may be used to indicate their respective indices in the subset of sequences.

Further details related to the invention will now be described with reference to embodiments for obtaining a set of time domain signals based on the set of sequences according to the invention, where the set of time domain signals are a set of SRSs.

Figure 7:
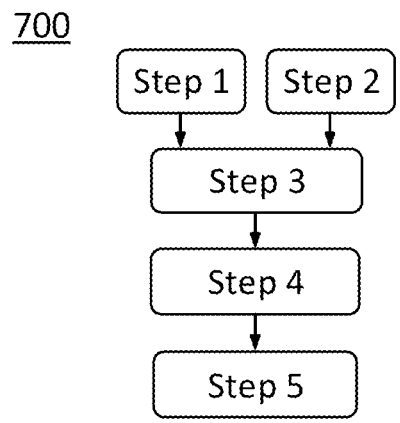
FIG. 7 shows a method for obtaining a set of SRSs according to an example of the invention.

FIG. 7 shows a flow chart of a method 700 for obtaining the set of SRSs. According to an embodiment of the invention the method 700 comprises the following steps:

Step 1: Determine common frequency resources for all the SRSs in a set of SRSs. The set of corresponding subcarrier indices is denoted by $\overline{\Omega}_m$, with $\overline{\Omega}_m \subseteq \{0, 1, \ldots, N-1\}$ and $|\overline{\Omega}_m|=L \leq N$, where $\overline{\Omega}_m$ (m=0, 1, ..., B-1) refers to the m-th possible frequency resource location for SRS in the SRS frequency band and $|\cdot|$ denotes the size of a set;

Step 2: Generate a set of QA length-L modulation sequences $\{c_{q,n}(u)|q=0, 1, \ldots, Q-1, n=0, 1, \ldots, A-1, u=0, 1, \ldots, L-1\}$;

Step 3: Map the modulation sequences $\{c_{q,n}(u)\}$ to the frequency resources $\overline{\Omega}_m$, to obtain Fourier coefficients $\{\overline{S}_{m,q,n}(f)|q=0, 1, \ldots, Q-1, n=0, 1, \ldots, A-1, f=0, 1, \ldots, N-1\}$;

Step 4: Add proper phase rotations to obtain modified Fourier coefficients $\{S_{m,q,n}(f)|q=0, 1, \ldots, Q-1, n=0, 1, \ldots, A-1, f=0, 1, \ldots, N-1\}$, in order to achieve desired cyclic shifts in time domain;

Step 5: Convert the modified Fourier coefficients $\{S_{m,q,n}(f)\}$ to the time domain SRS via scaled IDFT, yielding the set of SRSs $\{s_{m,q,n}(k)|q=0, 1, \ldots, Q-1, n=0, 1, \ldots, A-1, k=0, 1, \ldots, N-1\}$.

Each SRS in the obtained set of SRSs has a ZAZ in its periodic autocorrelation function, and any two SRSs have a ZCCZ in their periodic cross-correlation function. The ZCCZ length $D_{ZCCZ}$ is equal to the ZAZ length $D_{ZAZ}$ if the SRSs are from the same orthogonal SRS subset, or is approximately equal to a multiple of $D_{ZAZ}/Q$ if the SRSs are from different orthogonal SRS subsets, where the multiple depends on the difference of the cyclic shifts associated with each subset. The steps in the SRS construction is further described in the subsequent subsections.

Step 1: Common Frequency Resources for a SRS Set

The SRS frequency band consists of N subcarriers, with frequencies $f=\{f_0, \ldots, f_{N-1}\}$ with uniform spacing $\Delta f$ between neighboring frequencies. Without loss of generality it is assumed that $f_0=0$ and $\Delta f=1$, and the totally available frequency resources is denoted as $f=\{0, 1, \ldots, N-1\}$, i.e. the subcarrier frequencies will be referred to by the corresponding subcarrier indices.

It is assumed that N=δt, with δ and t being positive integers, and N subcarriers are divided into t subbands of δ consecutive subcarriers. The same number of $A_{SC}$ ($A_{SC}=A \leq \delta$) subcarriers are selected in each subband with the same distribution to be used for transmission. There can be $B=\lfloor \delta/A \rfloor$ such selections without selecting any subcarrier more than one time, and each of the A subcarriers in one selection is called the generalized physical resource blocks (gPRB), where $\lfloor x \rfloor$ is the greatest integer less than or equal to x.

The indices of the A subcarriers in the m-th (m=0, 1, ..., B-1) gPRB are denoted by $\{j_{m,l}|l=0, 1, \ldots, A-1\}$ such that $\kappa \leq j_{m,0} < j_{m,1} < \ldots < j_{m,A-1} \leq \delta-1$.

Then all the m-th gPRBs in t different subbands form an interlace. An interlace is mathematically described as a set of L=At used, i.e. allowed, subcarrier frequencies $\overline{\Omega}_m$ (m=0, 1, ..., B-1), defined as $$\overline{\Omega}_m = \{\delta i + j_{m,l} | i=0,1,\ldots,t-1, l=0,1,\ldots,A-1\}. \quad (12)$$

B orthogonal interlaces are constructed in a given SRS frequency band, where it holds that $$\overline{\Omega}_x \cap \overline{\Omega}_y = \phi \text{ if } x \neq y, \cup_{m=0}^{B-1} \overline{\Omega}_m \{0,1,\ldots,N-1\}. \quad (13)$$

Waveforms whose spectrum is defined as in (12) can be classified as a generalized version of block-interleaved frequency-division multiple access (B-IFDMA) waveforms. A B-IFDMA waveform, originally proposed by structuring the frequency resources of OFDM waveforms, is a base-band analog signal with a comb spectrum, with non-zero DFT coefficients only at discrete frequencies within certain number of equidistant and identical blocks of uniformly spaced subcarriers.

Step 2: Modulation Sequences

Each of QA modulation sequences $\{c_{q,n}(u)|q=0, 1, \ldots, Q-1, n=0, 1, \ldots, A-1, u=0, 1, \ldots, L-1\}$, is in embodiments a constant-envelope sequence of length L=At, constructed as $$c_{q,n}(u) = b_{q,n}(u \bmod A) a(u), u = 0, 1, \ldots, L-1, L = At \quad (14)$$

where

- $b_{q,n}(l)$, $l=0, 1, \ldots, A-1$, is the n-th ($n=0, 1, \ldots, A-1$) sequence in the q-th ($q=0, 1, \ldots, Q-1$) orthogonal subset. Such sequences will be labelled as "short" sequences. All the short sequences in the q-th orthogonal subset are mutually orthogonal.
- $a(u)$ is a constant-envelope sequence of length $L=At$. Such a sequence will be labelled as a "long" sequence. As it will be shown later, the long sequence has a decisive impact on the peak-to-average power ratio (PAPR) for the corresponding SRS; additionally, multiple different sequences $a(u)$ can be used to generate additional sets of SRSs. For example, the long sequence $a(u)$ can be generated as in the third conventional solution, i.e. $a(u) = W_t^{\mu(u \bmod A) \lfloor u/A \rfloor}$, ($u=0, 1, \ldots, L-1$), where $W_t = \exp(-\sqrt{-1}\, 2\pi/t)$ and $\mu(\cdot)$ is a permutation over the set $\{0, 1, \ldots, A-1\}$. In this case, the generated SRS can have 0 dB PAPR if $t=A$. Different permutations $\mu(\cdot)$ can be used to generate different sets of SRSs, which e.g. could be deployed in different cells. A more general construction of long sequences $a(u)$ that produce 0 dB PAPR without restriction $t=A$ will be presented at the end of this section.

The proposed modulation sequences $\{c_{q,n}(u)\}$ differ from the sequences constructed in the third conventional solution, both by the design of the short and of the long sequences.

The set of proposed short sequences has QA sequences, while in the third conventional solution it has A sequences. A rather general construction of proposed $\{b_{q,n}(l)\}$, potentially applicable in future systems based on extensions/adaptations of the second conventional solution is as follows.

Example construction of the proposed short sequences: the q-th ($q=0, 1, \ldots, Q-1$) orthogonal subset $\{b_{q,n}(l)\}$ is the set of all columns of an A×A matrix, where all the different cyclically shifted versions of a ZC sequence (11) of prime length A, obtained for a sub-set specific root index, are mapped to different rows, where the relation between a row index and a corresponding cyclic shift is determined by some permutation of the set of integers $\{0, 1, \ldots, A-1\}$; and where each column is multiplied element-by-element with elements of a cover sequence. Both row indices permutation and a cover sequence could be specific for the q-th orthogonal subset. Obviously, $Q \leq A-1$.

A general construction of long sequences $a(u)$ that produce 0 dB PAPR without restriction $t=A$ and for arbitrary number $\delta$ of subcarriers in a subband, is based on modulatable constant amplitude zero-autocorrelation (mCAZAC) sequences. A CAZAC sequence $\{a(k)\}$ has an ideal periodic autocorrelation function, i.e. $\theta_{aa}(P)=0$, $|p|=1, 2, \ldots, L-1$. As a consequence of this autocorrelation property and the constant amplitude, the sequence of the DFT coefficients $\{\Lambda(f)\}$ of $\{a(k)\}$ is also a CAZAC sequence. This can be seen from the frequency-domain definition of the periodic autocorrelation, given by $$\theta_{aa}(p) = \sum_{f=0}^{L-1} \Lambda^*(f) \Lambda(f) W_L^{-pf} \quad (15)$$

which is zero for any $0 < |p| < L$ only if $|\Lambda(f)| = \text{constant} = |a(k)|$ for $0 \leq f < L$.

A CAZAC sequence $fa(k))$ is called modulatable if it can be represented as a product of two sequences, a specific carrier sequence $\{\chi(k)\}$ of length $L=At$ and an arbitrary, shorter and t times periodically extended, modulation sequence $\{\eta(l)\}$ of length A, i.e. when $$a(k) = \chi(k) \eta(k \bmod A), k = 0, 1, \ldots, L-1, L = At. \quad (16)$$

The DFT sequence $\{\Lambda(f)\}$ can be thus described as $$\Lambda(f) = \frac{1}{\sqrt{L}} \sum_{k=0}^{L-1} a(k) W_L^{fk} \quad (17)$$

$$= \frac{1}{\sqrt{L}} \sum_{l=0}^{A-1} W_L^{fl} \sum_{i=0}^{t-1} \eta(l) \chi(Ai+l) W_t^{fi}$$

$$= \frac{1}{\sqrt{L}} \sum_{l=0}^{A-1} W_L^{fl} \sum_{i=0}^{t-1} a(Ai+l) W_t^{fi}.$$

To have $|\Lambda(f)| = \text{constant} = |a(k)|$ for $0 \leq f < L$ and arbitrary constant-amplitude sequence $\{\eta(k)\}$, the sum over l in Eq. (17) must have only one non-zero element for any f. This is possible only if the sum over i is non-zero and has the absolute value equal to $|\Lambda(f)|$ only for a single value of l for given value of f. If the mCAZAC sequence $\{a(k)\}$ has the unit amplitude, then from Eq. (17) it follows that the non-zero absolute value of the sum over i is equal to $\sqrt{L}$. This conclusion is summarized in the following Lemma:

Lemma: If a sequence $\{a(k)\}$ is a mCAZAC sequence (16) of the unit amplitude, then $$\left| \sum_{i=0}^{t-1} a(Ai+l) W_t^{fi} \right| = \begin{cases} \sqrt{L}, & l = \hat{l} \\ 0, & l \neq \hat{l} \end{cases} \quad (18)$$

where $\hat{l}$ is one and only one value of l among $\{0, 1, \ldots, A-1\}$ for given value of f.

This Lemma is used further below to prove the 0 dB PAPR property of the proposed SRSs, for arbitrary size $\delta$ of interlacing subbands and arbitrary number $A \leq \delta$ of allowed subcarriers, as long as the long sequence $\{a(k)\}$ of length $L=At$ is a modulatable CAZAC sequence, where t is a multiple (including 1) of A.

All known modulatable CAZAC sequences are of a length that can be expressed as an integer multiple of another squared integer. It means that for a given t any A can be selected that is a factor of t, i.e. $t=sA$, and generate the corresponding mCAZAC sequence $\{a(k)\}$ of length $L = At = sA^2$.

The earliest construction of mCAZAC produces modulatable Frank sequences of length $L=A^2$. The mCAZAC sequences of length $L=sA^2$ have been constructed, as a class of generalized chirp-like (GCL) sequences obtained by modulating ZC sequences of length $L=sA^2$, i.e. by using Eq. (17) where the carrier sequence $\{\chi(k)\}$ is a ZC sequence of length $L=sA^2$. GCL sequences with minimum alphabets have been derived, where it has been shown that the aforementioned modulatable Frank sequences are a special case of GCL sequences. The GCL sequences have been further generalized, in the so-called unified construction of mCAZAC sequences, given by $$\left\{ a(iA+l) = \eta(l) W_L^{E(iA+l)} \mid i = 0, 1, \ldots, sA-1, l = 0, 1, \ldots, A-1 \right\} \quad (19)$$

$$E(iA+l) = \frac{A^2(s+1)}{2}\left[r_0 + n_0 \frac{l(l+1)}{2}\right]i^2 + A[r_1 \mu(l) + n_1]i$$

$$(s+1)n_0 \equiv 0 \pmod{2}, \left(r_0 + n_0 \frac{l(l+1)}{2}, s\right) = 1, (r_1, A) = 1$$

where $r_0$, $n_0$, $r_1$ and $n_1$ are integers, and $\mu(\cdot)$ is a permutation over the set $\{0, 1, \ldots, A-1\}$.

The construction in Eq. (19) can be further generalized and in the same time simplified as $$\{a(iA+l) = \eta(l)W_L^{E(iA+l)} \mid i=0,1,\ldots,sA-1, l=0,1,\ldots,A-1\} \quad (20)$$

$$E(iA+l) = \frac{A^2(s+1)}{2}r_0(l)i^2 + A[r_1\mu(l)+n_1]i$$

$$(r_0(l),s) = 1, (r_1, A) = 1$$

where $r_0(l)$, $r_1$ and $n_1$ are integers, and $\mu(\cdot)$ is a permutation over the set $\{0, 1, \ldots, A-1\}$.

For example, previously mentioned long sequence $a(u) = W_A^{\mu(u \bmod A)\lfloor u/A\rfloor}\mid u=0,1,\ldots,L-1\}$, of length $L=A^2$ is actually the generalized modulatable Frank sequence, which can be obtained from Eq. (20) as a special case for $s=1$, $r_0=n_0=n_1=0$, $r_1=1$. If the permutation $\mu(\cdot)$ is equal to $0, 1, \ldots, A-1\}$, modulatable Frank sequences are obtained.

Step 3: Fourier Coefficients

A sequence of N Fourier coefficients is obtained as $$\tilde{S}_{m,q,n}(f) = \begin{cases} c_{q,n}(Ai+l), & f = \delta i + j_{m,l} \in \overline{\Omega}_m; \\ 0, & \text{otherwise} \end{cases} \quad (21)$$

As there are B disjoint interlaces $\overline{\Omega}_m$ (m=0, 1, ..., B−1), up to B sets of non-orthogonal SRSs can be constructed using the same set of modulation sequences $\{c_{q,n}(u)\}$. Since different interlaces are orthogonal to each other by definition, any two SRSs from different interlaces have zero periodic cross-correlation, and thus can be transmitted in parallel in the same cell without introducing interference to each other.

Step 4: Time-Domain Cyclic Shifts

Fourier coefficients $\{\tilde{S}_{m,q,n}(f)\}$ are modified into $\{S_{m,q,n}(f)\}$, such that $$S_{m,q,n}(f) = W_N^{\Delta_q f}\tilde{S}_{m,q,n}(f), f=0,1,\ldots,N-1, q=0,1,\ldots,Q-1 \quad (22)$$

where $W_N = \exp(-\sqrt{-1}\ 2\pi/N)$ and $0 \leq \Delta_q < t$ is the phase rotation increment for all SRSs in the q-th orthogonal SRS subset. Without loss of generality, it is assumed $$\Delta_0 = 0 < \Delta_1 < \ldots < \Delta_{Q-1} < t. \quad (23)$$

The purpose of adding phase rotations to Fourier coefficients is to achieve different desired time-domain cyclic shifts for the SRSs. When multiple such SRSs are concurrently transmitted with aligned arrival time (for example, via TA mechanism described earlier), the above phase rotation operation guarantees that the periodic cross-correlation between any two SRSs from two different orthogonal SRS subsets $q_x$ and $q_y$ has non-zero values only at delays $p=|\Delta_x - \Delta_y|+t\varphi$, $\varphi=0, 1, \ldots, \delta-1$, as it will be shown below.

As all the SRSs in the q-th orthogonal subset are cyclically shifted by the same time offset $\Delta_q$ the pairwise ZCCZ of SRSs in the same orthogonal SRS subset will not be affected by the time offset.

In one embodiment, the phase rotation step $\Delta_q$ is taken to be $$\Delta_q = q\lceil t/Q\rceil, q=0,1,\ldots,Q-1. \quad (24)$$

In another embodiment, the phase rotation step $\Delta_q$ is taken to be $$\Delta_q = \lfloor qt/Q\rfloor, q=0,1,\ldots,Q-1. \quad (25)$$

Step 5: Time-Domain SRSs

The time-domain SRS $\{s_{m,q,n}(k)\}$ is obtained by IDFT of its corresponding Fourier coefficients $\{S_{m,q,n}(f)\}$, yielding $$s_{m,q,n}(k) = \frac{1}{\sqrt{N}}\sum_{f=0}^{N-1} S_{m,q,n}(f)W_N^{-kf}, \quad (26)$$

$$q=0,1,\ldots,Q-1, n=0,1,\ldots,A-1, k=0,1,\ldots,N-1$$

where the scaling constant $1/\sqrt{N}$ ensures that the sequence $\{S_{m,q,n}(f)\}$ and the corresponding SRS $\{s_{m,q,n}(k)\}$ have the same energy E=L.

Alternative Implementations

The first communication device 100 may in embodiments be configured to perform the steps of the first communication device 100 according to the fifth or sixth aspect of the invention disclosed in the summary, i.e. obtain the time domain signal according to the invention using alternative steps, as will be further described later. The corresponding alternative implementations for embodiments where the set of time domain signals are a set of SRSs will now be described.

In one equivalent implementation, the order of step 4 and step 5 may be switched, so that in a new step 4 the Fourier coefficients $\{\tilde{S}_{m,q,n}(f)\}$ are converted to time domain sequence $\{\tilde{s}_{m,q,n}(k)\mid k=0,1,\ldots,N-1\}$ as $$\tilde{s}_{m,q,n}(k) = \frac{1}{\sqrt{N}}\sum_{f=0}^{N-1}\tilde{S}_{m,q,n}(f)W_N^{-kf}, \quad (27)$$

$$q=0,1,\ldots,Q-1, n=0,1,\ldots,A-1, k=0,1,\ldots,N-1.$$

Then, in a new step 5, all the time-domain sequences $\{\tilde{s}_{m,q,n}(k)\}$ in the q-th orthogonal SRS subset are cyclically shifted by the same time offset of $\Delta_q$ samples to obtain the time-domain SRSs, i.e.

$$s_{m,q,n}(k) = \tilde{s}_{m,q,n}((k+\Delta_q)\bmod N), \quad (28)$$

q=0, 1, ..., Q−1, n=0, 1, ..., A−1, k=0, 1, ..., N−1.

In another equivalent implementation of the SRS generation, step 4 can be eliminated by an alternative implementation of step 2, i.e. included in the generation of the modulation sequence $\{c_{n,q}(u)\}$. This can be seen as substituting Eq. (14) and (21) into Eq. (22) to achieve $$S_{m,q,n}(f) = W_N^{\Delta_q f}\tilde{S}_{m,q,n}(f) = \begin{cases} \left(W_N^{\Delta_q j_{m,l}}b_{q,n}(l)\right)\left(W_t^{\Delta_q i}a(Ai+l)\right) & f=\delta i+j_{m,l}; \\ 0 & \text{otherwise.} \end{cases} \quad (29)$$

Obviously, Eq. (29) could be obtained just from the concatenation of step 2 and step 5, if the sequence $\{c_{q,n}(u)\}$ is redefined in step 2 as $$c_{q,n}(u) = \tilde{b}_{q,n}(u \bmod A) a_q(u), u = 0, 1, \ldots, L-1 \quad (30)$$

where $\tilde{b}_{q,n}(l) = W_N^{\Delta_q j_{m,l}} b_{q,n}(l)$, $a_q(u) = W_t^{\Delta_q \lfloor u/\delta \rfloor} a(u)$, and $b_{q,n}(u)$ and $a(u)$ have the same definition as those in Eq. (14).

In the following subsections properties of the proposed SRS will be discussed and the correlation and PAPR properties for the proposed SRSs will be proven.

Periodic Autocorrelation

Starting from the frequency-domain definition of the periodic autocorrelation function of an SRS $\{s_{m,q,n}(k)\}$, the periodic autocorrelation is obtained by $$\theta_{s_{m,q,n},s_{m,q,n}}(p) = \sum_{f=0}^{N-1} S^*_{m,q,n}(f) S_{m,q,n}(f) W_N^{-pf} \quad (31)$$

$$= \sum_{l=0}^{A-1} W_N^{-p j_{m,l}} \sum_{i=0}^{t-1} W_t^{-pi}$$

$$= \begin{cases} E, & p = 0 \\ 0, & p \not\equiv 0 \pmod{t} \\ t \sum_{l=0}^{A-1} W_\delta^{\varphi j_{m,l}}, & p = t\varphi, \varphi = 1, \ldots, \delta - 1 \end{cases}$$

From Eq. (31) it is concluded that the periodic autocorrelation function has a ZAZ of length at least $D_{ZAZ} = t - 1$, what is the case when $\sum_{l=0}^{A-1} W_\delta^{j_{m,l}} \neq 0$. However, this sum could be equal to zero in some special cases of $j_{m,l}$.

For example, if $A$ and $\delta$ can be decomposed as products of integers, i.e. if $A = A'\sigma$ and $\delta = A'\sigma B$, then $j_{m,l}$ can be defined as $$j_{m,l} = \frac{\delta}{\sigma} i' + j'_{m,l'}, l = A'i' + l', A' = A/\sigma \quad (32)$$

$$i' = 0, 1, \ldots, \sigma - 1, l' = 0, 1, \ldots, A' - 1.$$

From Eq. (31) it follows that $$\sum_{l=0}^{A-1} W_\delta^{\varphi j_{m,l}} = \sum_{l'=0}^{A'-1} W_\delta^{\varphi j'_{m,l'}} \sum_{i'=0}^{\sigma-1} W_\sigma^{\varphi i'} = 0, \text{ for} \quad (33)$$

$\varphi \neq 0 \pmod{\sigma}$ i.e. $p \neq 0 \pmod{t\sigma}$.

From Eq. (33) it can be seen that the periodic autocorrelation function has a ZAZ of length $D_{ZAZ} = t\sigma - 1$ if Eq. (32) holds, even if the short sequences $\{b_{q,n}(l)\}$ are of length $A$.

Periodic Cross Correlation

For any two SRSs $s_{m,q=x,n=w}(k)$ and $s_{m,q=y,n=v}(k)$, $$\theta_{s_{m,y,v},s_{m,x,w}}(p \geq 0) = \left( \sum_{l=0}^{A-1} b^*_{x,w}(l) b_{y,v}(l) W_N^{(\Delta_y - \Delta_x - p) j_{m,l}} \right) \left( \sum_{i=0}^{t-1} W_t^{(\Delta_y - \Delta_x - p) i} \right) \quad (34)$$

$$= \begin{cases} t \sum_{l=0}^{A-1} b^*_{x,w}(l) b_{y,v}(l) W_N^{(\Delta_y - \Delta_x - p) j_{m,l}}, & p \equiv \Delta_y - \Delta_x \pmod{t} \\ 0, & p \not\equiv \Delta_y - \Delta_x \pmod{t} \end{cases}$$

assuming $\Delta_y \geq \Delta_x$ without loss of generality. For negative delays $-p$ the identity $\theta_{rs}(-p) = \theta^*_{sr}(p)$, $p > 0$ can be used, $$\theta_{s_{m,y,v},s_{m,x,w}}(p' = -p < 0) = (\sum_{l=0}^{A-1} b^*_{x,w}(l) b_{y,v}(l) W_N^{(\Delta_y - \Delta_x + p) j_{m,l}}) (\sum_{i=0}^{t-1} W_t^{(\Delta_y - \Delta_x + p) i}). \quad (35)$$

The summation over $i$ is zero either for $p \equiv -(\Delta_y - \Delta_x) \pmod{t}$, which is negative, or for $p \equiv t - (\Delta_y - \Delta_x) \pmod{t}$, which is positive. As $p$ in Eq. (35) is positive, $$\theta_{s_{m,y,v},s_{m,x,w}}(-p) = \begin{cases} t \sum_{l=0}^{A-1} b^*_{x,w}(l) b_{y,v}(l) W_N^{(\Delta_y - \Delta_x + p) j_{m,l}}, & p \equiv t - (\Delta_y - \Delta_x) \pmod{t} \\ 0, & p \not\equiv t - (\Delta_y - \Delta_x) \pmod{t} \end{cases} \quad (36)$$

From Eq. (34) and (36) it is obvious that the periodic cross-correlation $\theta_{s_{m,y,v},s_{m,x,w}}(p)$ has zero value for a range of consecutive delays $p$ around and including $p = 0$. This range of delays is on the positive side ($p \geq 0$) bounded at the distance $(\Delta_y - \Delta_x)$ and on the negative side ($p < 0$) bounded at the distance $t - (\Delta_y - \Delta_x)$. As the ZCCZ is defined according to (7) as symmetrical around $p = 0$, the ZCCZ length in the periodic cross-correlation function between any two SRSs $s_{m,q=x,n=w}(k)$ and $s_{m,q=y,n=v}(k)$ is given by (assuming $\Delta_y > \Delta_x$)

$$D_{ZCCZ} = \min\left\{ \min_{y>x}\{\Delta_y - \Delta_x\}, \min_{y>x}\{t - (\Delta_y - \Delta_x)\} \right\} - 1 = \min\{X, Y\} - 1 \quad (37)$$

where $$X = \min_{0 \leq q \leq Q-1} \{\Delta_{q+1} - \Delta_q\}, \quad (38)$$

$$Y = t - (\Delta_{Q-1} - \Delta_0). \quad (39)$$

and where inequality $\Delta_y - \Delta_x \geq \Delta_{q+1} - \Delta_q$ that follows from Eq. (23) are used when $y > x$.

Now $\min\{X, Y\}$ can be found for each of the two constructions of $\Delta_q$.

When $\Delta_q = q \lfloor t/Q \rfloor$, obviously $X = \lfloor t/Q \rfloor$, while $$Y = t - (Q-1) \left\lfloor \frac{t}{Q} \right\rfloor.$$

Thus, the difference $Z = Y - X$ is given by $$Z = t - Q \left\lfloor \frac{t}{Q} \right\rfloor \geq 0 \quad (40)$$

which means that $\min\{X, Y\} = X = \lfloor t/Q \rfloor$.

When $\Delta_q = \lfloor qt/Q \rfloor$, $$X = \min_{0 \leq q \leq Q-1} \left\{ \left\lfloor \frac{(q+1)\left(Q\left\lfloor \frac{t}{Q} \right\rfloor + (t \bmod Q)\right)}{Q} \right\rfloor - \left\lfloor \frac{q\left(Q\left\lfloor \frac{t}{Q} \right\rfloor + (t \bmod Q)\right)}{Q} \right\rfloor \right\}$$
$$= \min_{0 \leq q \leq Q-1} \left\{ (q+1)\left\lfloor \frac{t}{Q} \right\rfloor + \left\lfloor \frac{(q+1)(t \bmod Q)}{Q} \right\rfloor - \left(q\left\lfloor \frac{t}{Q} \right\rfloor + \left\lfloor \frac{q(t \bmod Q)}{Q} \right\rfloor\right) \right\}$$
$$= \left\lfloor \frac{t}{Q} \right\rfloor + \min_{0 \leq q \leq Q-1} \left\{ \left\lfloor \frac{(q+1)(t \bmod Q)}{Q} \right\rfloor - \left\lfloor \frac{q(t \bmod Q)}{Q} \right\rfloor \right\} \quad (41)$$

And then $$\left\lfloor \frac{q(t \bmod Q)}{Q} + \frac{(t \bmod Q)}{Q} \right\rfloor - \left\lfloor \frac{q(t \bmod Q)}{Q} \right\rfloor \leq \left\lfloor \frac{(t \bmod Q)}{Q} \right\rfloor + 1 = 1 \quad (42)$$

where the right-hand side of Eq. (42) is obtained by first applying a well-known inequality $\lfloor x+y \rfloor \leq \lfloor x+y \rfloor \leq \lfloor x \rfloor + \lfloor y \rfloor + 1$ to the left-hand side of Eq. (42), and then using the fact that (t mod Q)≤Q−1, which causes that $\lfloor (t \bmod Q)/Q \rfloor = 0$. Therefore, the term $\lfloor (q+1)(t \bmod Q)/Q \rfloor - \lfloor q(t \bmod Q)/Q \rfloor$ in Eq. (41) is either 0 or 1, meaning that its minimum value is 0. Thus, from Eq. (41) and (42) it is obtained that $$X = \left\lfloor \frac{t}{Q} \right\rfloor. \text{ As } Y = t - \left\lfloor \frac{(Q-1)t}{Q} \right\rfloor,$$

Z=Y−X is given by $$Z = t - \left\lfloor \frac{(Q-1)t}{Q} \right\rfloor - \left\lfloor \frac{t}{Q} \right\rfloor \geq t - \frac{(Q-1)t}{Q} - \frac{t}{Q} = 0 \quad (43)$$

which means that min{X,Y}=X=$\lfloor t/Q \rfloor$.

Therefore, for both constructions of $\Delta_q$, $$D_{ZCCZ} = \left\lfloor \frac{t}{Q} \right\rfloor - 1. \quad (44)$$

In special case when y=x and w≠v, i.e. when observed SRSs are in the same orthogonal SRS subset, Eq. (34) and (36) reduces to the same formula, given by $$\theta_{s_{m,x,v},s_{m,x,w}}(p) = \begin{cases} t\sum_{l=0}^{A-1} b^*_{x,w}(l) b_{x,v}(l) W_N^{-pjm,l}, & p \equiv 0 \pmod{t} \\ 0, & p \not\equiv 0 \pmod{t} \end{cases} \quad (45)$$

If the short sequences {$b_{x,w}(l)$} and {$b_{x,v}(l)$}(w≠v) are orthogonal, from Eq. (45) it follows that the corresponding SRSs will also be orthogonal, i.e. $\theta_{s_{m,x,v},s_{m,x,w}}$(p=0)=0. For p=xt, x=1, ..., δ−1, $$\theta_{s_{m,x,v},s_{m,x,w}}(p=xt) = t\Sigma_{l=0}^{A-1} b^*_{x,w}(l) b_{x,v}(l) W_\delta^{-xjm,l} \quad (46)$$

which might be not equal to zero and therefore it is concluded that it has ZCCZ of length $D_{ZCCZ} \geq t-1$. The minimum ZCCZ length, t−1, is the same as the minimum ZAZ length.

The pairwise cross-correlations given either by Eq. (34) and (36) or by (45) are equally sparse, i.e. have only δ (100/t percent) non-zero values.

Peak-to-Average-Power Ratio (PAPR)

The proposed SRSs have 0 dB PAPR, for arbitrary size δ of interlacing subbands and arbitrary number A≤δ of allowed subcarriers, as long as the long sequence {a(k)} of length L=At is a modulatabe CAZAC sequence, where t is a multiple (including 1) of A.

To see that, let SRS {$s_{m,q=x,n=w}(k)$} be expressed as $$s_{m,x,w}(k) = \frac{1}{\sqrt{N}} \sum_{l=0}^{A-1} W_N^{(\Delta_x - k)jm,l} b_{x,w}(l) \sum_{i=0}^{t-1} W_t^{(\Delta_x - k)i} a(iA + l), k = 0, 1, \ldots, N - 1. \quad (47)$$

According to Lemma (18), if the sequence {a(k)} is a mCAZAC sequence of the unit amplitude, then the sum over i is non-zero and has the absolute value equal to $\sqrt{L}=\sqrt{At}$ only for a single value of l for given value of ($\Delta_x - k$). Therefore, it is obtained $$|s_{m,x,w}(k)| = \sqrt{A/\delta}, k=0,1,\ldots,N-1. \quad (48)$$

The following subsections discusses the deployment of the invention in 3GPP NR systems.

Setting CIR Detection Time Window

Setting of CIR detection time window of length D at the receiver (e.g. BS) has been briefly discussed in the background, where it was stated that D≥min{$D_{ZAZ},D_{ZCCZ}$}≥C−1. As shown in the previous section, $D_{ZAZ}$=t−1 while $D_{ZCCZ}$ can have two possible values: $D_{ZCCZ}^{non-orth}$=$\lfloor t/Q \rfloor$−1 and $D_{ZCCZ}^{orth}$=t−1. To be able to deploy both of them, the length N=δt of SRSs is selected using t such that $D_{ZAZ}$=t−1≥C−1, where C is the maximum expected length of channel impulse response.

The BS is the one which allocates the SRSs to the active UEs and is also the one that knows which of them are concurrently active. Depending on whether the concurrently active UEs are assigned the SRSs from the same orthogonal subset, or from multiple orthogonal subsets, the BS can select D to be either D=min{t−1, t−1}=t−1, or D=min{t−1, $\lfloor t/Q \rfloor -1\} = \lfloor t/Q \rfloor -1$. Obviously, if all SRSs are from the same orthogonal subset, all the corresponding CIRs of maximum length C can be estimated without interference.

If the SRSs are from different orthogonal SRS subsets, only $\lfloor t/Q \rfloor$ coefficients of each CIR can be estimated. If none of the concurrent propagation channel realizations has the channel impulse response longer than $\lfloor t/Q \rfloor$, all the related CIRs can be estimated without interferences. However, if some of the concurrent propagation channel realizations have the channel impulse responses of length $C > \lfloor t/Q \rfloor$, the estimated CIR samples of the observed UE will be interfered by the tail ($C - \lfloor t/Q \rfloor$ latest coefficients) of the CIR of an interfering UE. This might not have a detrimental effect on the estimated CIR, as the CIR power is mostly carried by its head instead of by its tail. These two cases are illustrated in FIGS. 8a-b.

Figure 8A:
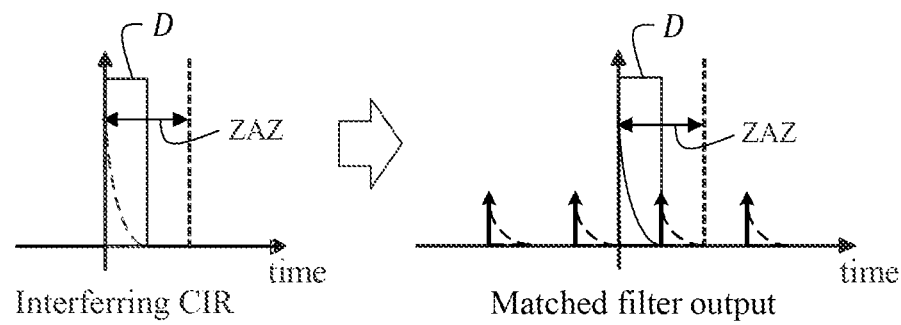
FIGS. 8a-b show the estimation of the target CIR with the presence of an interfering CIR according to an example of the invention.
Figure 8B:
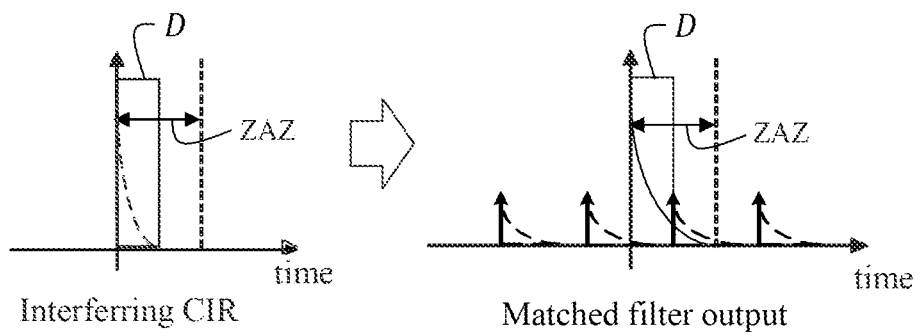

FIGS. 8a-b illustrates the CIR estimation when an interfering non-orthogonal SRS is received with the same arrival time as the target SRS at the BS, where Q=2. The graph on the left in FIGS. 8a-b illustrates the CIR of the propagation channel experienced by the interfering non-orthogonal SRS, and the graph on the right in FIGS. 8a-b illustrates the matched filter output for the estimation of the propagation channel experienced by the target SRS, where the match filter output comprise replicas of both the target CIR (solid curves) and interfering CIR (dashed curves).

FIG. 8a, illustrates the case where $C \leq \lfloor t/Q \rfloor$. In this case, none of the propagation channels experienced by concurrent SRSs has its CIR length longer than $\lfloor t/Q \rfloor$ and hence no part of the target CIR is interfered by the interfering CIR, as shown in the right graph of FIG. 8a. Thus, the target CIR can be estimated without interference.

FIG. 8b illustrates the case where $\lfloor t/Q \rfloor < C \leq t$. In this case, the head and tail of the target CIR suffer from, respectively, the interference from the tail and head of a certain replica of the interfering CIR, as shown in the right graph of FIG. 8b. Since in practice, the CIR power is mostly carried by its head instead of by its tail, the head of the target CIR can be estimated with only marginal interference from the tail of an interfering CIR, and the tail of the target CIR can be simply ignored and not estimated, which will not have a detrimental effect on the estimation of the target CIR.

Setting of Other Parameters

The disclosed SRS design in this invention can be readily adopted to the current 3GPP NR systems by taking proper values for the related parameters. In one embodiment of the invention, the size of an interlacing subband is taken to be $\delta=16$ and the length of the short sequence is taken to be A=8, with the 8 subcarriers in each gPRB to be every second subcarrier in each interlacing subband. Consequently, the number of interlacing subbands is taken to be t=N/16 depending on the SRS bandwidth. The advantage of such a parameter setting is that it results in the same frequency resource location and the same number of orthogonal SRSs as Comb-2 in 3GPP NR. For example, the values of these parameters are given in Table 1 below, where the values of SRS bandwidth are those supported in 3GPP NR systems. Table 1 shows examples of parameter setting that result in the same frequency domain location and the same number of orthogonal SRSs as Comb-2 in 3GPP NR.

TABLE 1

| SRS bandwidth (# of PRBs) | δ | A | t |
|---|---|---|---|
| 8 | 16 | 8 | 6 |
| 12 | 16 | 8 | 9 |
| 16 | 16 | 8 | 12 |
| 20 | 16 | 8 | 15 |
| 24 | 16 | 8 | 18 |
| 28 | 16 | 8 | 21 |
| 32 | 16 | 8 | 24 |
| 36 | 16 | 8 | 27 |
| 40 | 16 | 8 | 30 |
| 44 | 16 | 8 | 33 |
| 48 | 16 | 8 | 36 |
| 52 | 16 | 8 | 39 |
| 56 | 16 | 8 | 42 |
| 60 | 16 | 8 | 45 |
| 64 | 16 | 8 | 48 |
| 68 | 16 | 8 | 51 |
| 72 | 16 | 8 | 54 |
| 76 | 16 | 8 | 57 |
| 80 | 16 | 8 | 60 |
| 84 | 16 | 8 | 63 |
| 88 | 16 | 8 | 66 |
| 92 | 16 | 8 | 69 |
| 96 | 16 | 8 | 72 |
| 104 | 16 | 8 | 78 |
| 108 | 16 | 8 | 81 |
| 112 | 16 | 8 | 84 |
| 120 | 16 | 8 | 90 |
| 128 | 16 | 8 | 96 |
| 132 | 16 | 8 | 99 |
| 136 | 16 | 8 | 102 |
| 144 | 16 | 8 | 108 |
| 152 | 16 | 8 | 114 |
| 160 | 16 | 8 | 120 |
| 168 | 16 | 8 | 126 |
| 176 | 16 | 8 | 132 |
| 184 | 16 | 8 | 138 |
| 192 | 16 | 8 | 144 |
| 208 | 16 | 8 | 156 |
| 216 | 16 | 8 | 162 |
| 224 | 16 | 8 | 168 |
| 240 | 16 | 8 | 180 |
| 256 | 16 | 8 | 192 |
| 264 | 16 | 8 | 198 |
| 272 | 16 | 8 | 204 |

In one embodiment of the invention, the size of an interlacing subband is taken to be $\delta=24$ and the length of the short sequence is taken to be A=12, with the 12 subcarriers in each gPRB to be every second subcarrier in each interlacing subband. Consequently, the number of interlacing subbands is taken to be t=N/24 depending on the SRS bandwidth. The advantage of such a parameter setting is that it results in the same frequency resource location as Comb-2 in 3GPP NR. For example, the values of these parameters are given in Table 2 below, where the values of SRS bandwidth are those supported in 3GPP NR systems. Table 2 shows examples of parameter setting that result in the same frequency domain location as Comb-2 in 3GPP NR.

TABLE 2

| SRS bandwidth (# of PRBs) | δ | A | t |
|---|---|---|---|
| 8 | 24 | 12 | 4 |
| 12 | 24 | 12 | 6 |
| 16 | 24 | 12 | 8 |
| 20 | 24 | 12 | 10 |
| 24 | 24 | 12 | 12 |
| 28 | 24 | 12 | 14 |

TABLE 2-continued

| SRS bandwidth (# of PRBs) | δ | A | t |
|---|---|---|---|
| 32 | 24 | 12 | 16 |
| 36 | 24 | 12 | 18 |
| 40 | 24 | 12 | 20 |
| 44 | 24 | 12 | 22 |
| 48 | 24 | 12 | 24 |
| 52 | 24 | 12 | 26 |
| 56 | 24 | 12 | 28 |
| 60 | 24 | 12 | 30 |
| 64 | 24 | 12 | 32 |
| 68 | 24 | 12 | 34 |
| 72 | 24 | 12 | 36 |
| 76 | 24 | 12 | 38 |
| 80 | 24 | 12 | 40 |
| 84 | 24 | 12 | 42 |
| 88 | 24 | 12 | 44 |
| 92 | 24 | 12 | 46 |
| 96 | 24 | 12 | 48 |
| 104 | 24 | 12 | 52 |
| 108 | 24 | 12 | 54 |
| 112 | 24 | 12 | 56 |
| 120 | 24 | 12 | 60 |
| 128 | 24 | 12 | 64 |
| 132 | 24 | 12 | 66 |
| 136 | 24 | 12 | 68 |
| 144 | 24 | 12 | 72 |
| 152 | 24 | 12 | 76 |
| 160 | 24 | 12 | 80 |
| 168 | 24 | 12 | 84 |
| 176 | 24 | 12 | 88 |
| 184 | 24 | 12 | 92 |
| 192 | 24 | 12 | 96 |
| 208 | 24 | 12 | 104 |
| 216 | 24 | 12 | 108 |
| 224 | 24 | 12 | 112 |
| 240 | 24 | 12 | 120 |
| 256 | 24 | 12 | 124 |
| 264 | 24 | 12 | 132 |
| 272 | 24 | 12 | 134 |

In one embodiment of the invention, the length of the short sequence is taken to be $A=\lfloor\sqrt{N/2s}\rfloor$ for a proper positive integers, and the size of an interlacing subband is taken to be $\delta=2A$ with the subcarriers of each gPRB to be every second subcarrier in each interlacing subband. Consequently, the number of interlacing subbands is taken to be $t=\lceil N/\delta \rceil \approx sA$ depending on the SRS bandwidth, where $[\cdot]$ is the rounding operation to the closest integer. In this case, the length-L (L=At) modulating sequence may need be properly shortened or periodically extended to length N/2 to fit the available SRS bandwidth. The advantage of such a parameter setting is that it results in the same frequency resource location as Comb-2 in 3GPP NR, and in the meanwhile the resultant SRSs have low PAPR. For example, the values of these parameters are given in Table 3 below with s=1, where the values of SRS bandwidth are those supported in 3GPP NR systems. Table 3 shows examples of parameter setting that result in the same frequency domain location as Comb-2 in 3GPP NR and low-PAPR SRSs.

TABLE 3

| SRS bandwidth (# of PRBs) | δ | A | t |
|---|---|---|---|
| 8 | 14 | 7 | 7 |
| 12 | 16 | 8 | 9 |
| 16 | 18 | 9 | 11 |
| 20 | 20 | 10 | 12 |
| 24 | 24 | 12 | 12 |

TABLE 3-continued

| SRS bandwidth (# of PRBs) | δ | A | t |
|---|---|---|---|
| 28 | 24 | 12 | 14 |
| 32 | 24 | 12 | 16 |
| 36 | 28 | 14 | 15 |
| 40 | 30 | 15 | 16 |
| 44 | 32 | 16 | 17 |
| 48 | 32 | 16 | 18 |
| 52 | 34 | 17 | 18 |
| 56 | 36 | 18 | 19 |
| 60 | 36 | 18 | 20 |
| 64 | 38 | 19 | 20 |
| 68 | 40 | 20 | 20 |
| 72 | 40 | 20 | 22 |
| 76 | 42 | 21 | 22 |
| 80 | 42 | 21 | 23 |
| 84 | 44 | 22 | 23 |
| 88 | 44 | 22 | 24 |
| 92 | 46 | 23 | 24 |
| 96 | 48 | 24 | 24 |
| 104 | 48 | 24 | 26 |
| 108 | 50 | 25 | 26 |
| 112 | 50 | 25 | 27 |
| 120 | 52 | 26 | 28 |
| 128 | 54 | 27 | 28 |
| 132 | 56 | 28 | 28 |
| 136 | 56 | 28 | 29 |
| 144 | 58 | 29 | 30 |
| 152 | 60 | 30 | 30 |
| 160 | 60 | 30 | 32 |
| 168 | 62 | 31 | 32 |
| 176 | 64 | 32 | 33 |
| 184 | 66 | 33 | 33 |
| 192 | 66 | 33 | 35 |
| 208 | 70 | 35 | 36 |
| 216 | 72 | 36 | 36 |
| 224 | 72 | 36 | 37 |
| 240 | 74 | 37 | 39 |
| 256 | 76 | 38 | 39 |
| 264 | 78 | 39 | 41 |
| 272 | 80 | 40 | 40 |

In one embodiment of the invention, the size of an interlacing subband is taken to be $\delta=48$ and the length of the short sequence is taken to be $A=12$, with the 12 subcarriers in each gPRB to be every fourth subcarrier in each interlacing subband. Consequently, the number of interlacing subbands is taken to be $t=N/48$ depending on the SRS bandwidth. The advantage of such a parameter setting is that it results in the same frequency resource location and the same number of orthogonal SRSs as Comb-4 in 3GPP NR. For example, the values of these parameters are given in Table 4 below, where the values of SRS bandwidth are those supported in 3GPP NR systems. Table 4 shows examples of parameter setting that result in the same frequency domain location as Comb-4 in 3GPP NR.

TABLE 4

| SRS bandwidth (# of PRBs) | δ | A | t |
|---|---|---|---|
| 12 | 48 | 12 | 3 |
| 16 | 48 | 12 | 4 |
| 20 | 48 | 12 | 5 |
| 24 | 48 | 12 | 6 |
| 28 | 48 | 12 | 7 |
| 32 | 48 | 12 | 8 |
| 36 | 48 | 12 | 9 |
| 40 | 48 | 12 | 10 |
| 44 | 48 | 12 | 11 |
| 48 | 48 | 12 | 12 |

TABLE 4-continued

| SRS bandwidth (# of PRBs) | δ | A | t |
|---|---|---|---|
| 52 | 48 | 12 | 13 |
| 56 | 48 | 12 | 14 |
| 60 | 48 | 12 | 15 |
| 64 | 48 | 12 | 16 |
| 68 | 48 | 12 | 17 |
| 72 | 48 | 12 | 18 |
| 76 | 48 | 12 | 19 |
| 80 | 48 | 12 | 20 |
| 84 | 48 | 12 | 21 |
| 88 | 48 | 12 | 22 |
| 92 | 48 | 12 | 23 |
| 96 | 48 | 12 | 24 |
| 104 | 48 | 12 | 26 |
| 108 | 48 | 12 | 27 |
| 112 | 48 | 12 | 28 |
| 120 | 48 | 12 | 30 |
| 128 | 48 | 12 | 32 |
| 132 | 48 | 12 | 33 |
| 136 | 48 | 12 | 34 |
| 144 | 48 | 12 | 36 |
| 152 | 48 | 12 | 38 |
| 160 | 48 | 12 | 40 |
| 168 | 48 | 12 | 42 |
| 176 | 48 | 12 | 44 |
| 184 | 48 | 12 | 46 |
| 192 | 48 | 12 | 48 |
| 208 | 48 | 12 | 52 |
| 216 | 48 | 12 | 54 |
| 224 | 48 | 12 | 56 |
| 240 | 48 | 12 | 60 |
| 256 | 48 | 12 | 64 |
| 264 | 48 | 12 | 66 |
| 272 | 48 | 12 | 68 |

In one embodiment of the invention, the length of the short sequence is taken to be $A=\lfloor\sqrt{N/4s}\rfloor$ for a proper positive integer s, and the size of an interlacing subband is taken to be $\delta=4A$ with the subcarriers of each gPRB to be every fourth subcarrier in each interlacing subband. Consequently, the number interlacing subbands is taken to be $t=\lceil N/6 \rceil \approx sA$ depending on the SRS bandwidth. In this case, the length-L (L=At) modulating sequence may need be properly shortened or periodically extended to length N/4 to fit the available SRS bandwidth. The advantage of such a parameter setting is that it results in the same frequency resource location as Comb-4 in 3GPP NR, and in the meanwhile the resultant SRSs have low PAPR. For example, the values of these parameters are given in Table 5 below with s=1, where the values of SRS bandwidth are those supported in 3GPP NR systems. Table 5 shows examples of parameter setting that result in the same frequency domain location as Comb-4 in 3GPP NR and low-PAPR SRSs.

TABLE 5

| SRS bandwidth (# of PRBs) | δ | A | t |
|---|---|---|---|
| 12 | 24 | 6 | 6 |
| 16 | 24 | 6 | 8 |
| 20 | 28 | 7 | 9 |
| 24 | 28 | 8 | 9 |
| 28 | 36 | 9 | 9 |
| 32 | 36 | 9 | 11 |
| 36 | 40 | 10 | 11 |
| 40 | 40 | 10 | 12 |
| 44 | 44 | 11 | 12 |
| 48 | 48 | 12 | 12 |
| 52 | 48 | 12 | 13 |
| 56 | 48 | 12 | 14 |
| 60 | 52 | 13 | 14 |
| 64 | 52 | 13 | 15 |
| 68 | 56 | 14 | 15 |
| 72 | 56 | 14 | 15 |
| 76 | 60 | 15 | 15 |
| 80 | 60 | 15 | 16 |
| 84 | 60 | 15 | 17 |
| 88 | 64 | 16 | 16 |
| 92 | 64 | 16 | 17 |
| 96 | 64 | 16 | 18 |
| 104 | 68 | 17 | 18 |
| 108 | 72 | 18 | 18 |
| 112 | 72 | 18 | 19 |
| 120 | 72 | 18 | 20 |
| 128 | 76 | 19 | 20 |
| 132 | 76 | 19 | 21 |
| 136 | 80 | 20 | 20 |
| 144 | 80 | 20 | 22 |
| 152 | 84 | 21 | 22 |
| 160 | 84 | 21 | 23 |
| 168 | 88 | 22 | 23 |
| 176 | 88 | 22 | 24 |
| 184 | 92 | 23 | 24 |
| 192 | 96 | 24 | 24 |
| 208 | 96 | 24 | 26 |
| 216 | 100 | 25 | 26 |
| 224 | 100 | 25 | 27 |
| 240 | 104 | 26 | 28 |
| 256 | 108 | 27 | 28 |
| 264 | 112 | 28 | 28 |
| 272 | 112 | 28 | 29 |

SRS Transmission Over Multiple Consecutive OFDM Symbols

In 3GPP NR systems, a SRS may be repeated multiple times to span a number of G consecutive OFDM symbols within each SRS period during the transmission. The purpose of SRS transmission over multiple consecutive OFDM symbols is to achieve a higher accumulated receive power of the transmitted SRS and in turn a higher channel estimation quality at the BS, which is advantageous for cell-edge UEs with large propagation loss between it and the BS. For example, the BS can perform channel estimation independently based on each received duplicate of the transmitted SRS. Although the accuracy of each estimated CIR may be low due to low received signal-to-noise ratio (SNR). This accuracy can be enhanced after taking average of the estimated CIRs from these multiple received SRS duplicates within one SRS period.

When the disclosed SRS is repeated over G consecutive OFDM symbols in each SRS period, it can be transmitted together with a length-G orthogonal cover code (OCC). By this means, one disclosed SRS can be reused together with up to G different OCCs that are orthogonal to each other and transmitted from different UEs and/or SRS antenna ports in parallel (with aligned arrival time). In this case, the channel estimation of them from the signal received in a single OFDM symbol always suffers full interference from each other. However, thanks to the orthogonality between different OCCs, such interference can be fully cancelled after averaging the estimated CIRs from G consecutive OFDM symbols according to the adopted OCC, assuming the channel variation across these G consecutive OFDM symbols is marginal and ignorable. By this means, the SRS capacity can be further increased by G times using the disclosed SRS design, compared to the case when a SRS is transmitted only over one OFDM symbol per SRS period.

In one embodiment, the OCCs can be taken to be the columns of a G×G DFT matrix, or columns of a G×G DFT matrix with row permutation, or columns of a G×G DFT with/without row permutation, which are further element-wisely multiplied with an arbitrary length-G sequence with constant envelope. For example, the OCCs can be [1, 1] and [1,−1] when G=2, or can be [1, 1, 1, 1], [1,j,−1,−j], [1,−1, 1,−1] and [1,−j,−1,j] with G=4.

In one embodiment, the OCCs can be taken to be the columns of a G×G Hadamard matrix, or columns of a G×G Hadamard matrix with row permutation, or columns of a G×G Hadamard matrix with/without row permutation, which are further element-wisely multiplied with an arbitrary length-G sequence with constant envelope. For example, the OCCs can be [1,1] and [1,−1] when G=2, or can be [1, 1, 1, 1], [1,−1,1,−1], [1, 1,−1,−1] and [1,−1,−1, 1] with G=4.

Signaling of SRS

Before a UE transmits a SRS, it needs to determine the configuration of the SRS to be transmitted from the higher layer signaling. The configuration of the SRS may include the SRS time-frequency resource for each SRS antenna port (e.g. the starting position in the time domain, the number of consecutive OFDM symbols in each SRS period, the starting position in frequency domain, the SRS bandwidth and the comb number) and the SRS sequence identity $n_{ID}^{SRS}$. The SRS time-frequency resource can be signaled in the same manner as in 3GPP NR, e.g. through SRS-Resource, and the SRS sequence identity $n_{ID}^{SRS}$ can be signaled in different ways as detailed below. It is noted that the values of δ, A and t can be derived from the SRS time-frequency resource configuration, and so do not need to be signaled separately.

In one embodiment when a UE needs to transmit SRSs from multiple SRS antenna ports over the same time-frequency resource, these SRSs are selected from the same orthogonal SRS subset on the same interlace and signaled to the UE.

In one embodiment when a UE needs to transmit SRSs from multiple SRS antenna ports over the same time-frequency resource, these SRSs are selected to have modulating sequences constructed based on short sequences from the same orthogonal short sequence subset and the same long sequence, mapped to different interlaces, and then signaled to the UE.

In one embodiment, the value of Q (i.e. the number of orthogonal SRS subsets in each SRS group) is a constant pre-specified in the standard and so unnecessary to be signaled.

In another embodiment, the value of Q is configurable and can be taken from a number of $N_Q$ values $\{Q_0, Q_1, \ldots, Q_{N_Q-1}\}$ pre-specified in the standard, and its detailed value is signaled to the UE via a $\lceil \log_2 N_Q \rceil$-bit string.

In one embodiment, the SRS sequence identity $n_{ID}^{SRS}$ is signaled to the UE by a single bit string of $\lceil \log_2(N_{set}QA) \rceil$ bits, where $N_{set}$ is the number of SRS sets defined in the system with each SRS set assigned to one cell, Q is the number of orthogonal SRS subsets in each SRS set, and A is the number of orthogonal SRSs within the orthogonal SRS subset.

In one embodiment, the SRS sequence identity $n_{ID}^{SRS}$ is signaled by two bit strings of lengths $\lceil \log_2(N_{set}) \rceil$ and $\lceil \log_2(QA) \rceil$, respectively, where the first bit string is used to indicate the index of the SRS set, and the second bit string is used to indicate the index of the SRS sequence within the SRS set.

In one embodiment, the SRS sequence identity $n_{ID}^{SRS}$ is signaled by three bit strings of length $\lceil \log_2(N_{set}) \rceil$, $\lceil \log_2(Q) \rceil$ and $\lceil \log_2(A) \rceil$, respectively, where the first bit string is used to indicate the index of the SRS set, the second bit string is used to indicate the index of the orthogonal SRS subset within the SRS set, and the third bit string is used to indicate the index of the SRS within the orthogonal SRS subset.

Link Level Performance Evaluation

A single-cell system at 5 GHz carrier frequency with 15 kHz SCS and bandwidth of 52 PRBs (i.e. there are N=52×12=624 subcarriers) is considered. To generate SRSs based on the disclosed method, it is assumed that δ=48, t=13, A=12 and that the A=12 subcarriers are distributed in each gPRB to be every fourth subcarrier in each interlacing subband. Consequently, there are B=⌊δ/A⌋=4 orthogonal interlaces. Without loss of generality, the first interlace is selected and QA=24 SRS sequences consisting of Q=2 orthogonal subsets are constructed, where the short sequences in each orthogonal short sequence subset are the 12 columns of the 12×12 DFT matrix, covered by a length-13 ZC sequence shortened to length 12 with two different ZC root indices (1 and 2) for the two orthogonal subsets, respectively, and the long sequence is selected to be $a(u)=W_t^{(u \bmod A)\lfloor u/A \rfloor}$.

For comparison, the SRSs from the second conventional solution, based on Comb-4 frequency resource allocation and ZC sequences, are also generated as reference. Each such SRS is constructed by a length-151 ZC sequence of a certain root index, cyclically extended to length 156, and then mapped to every fourth subcarrier of the frequency band. For each root index, 12 equally spaced cyclic shifts are adopted to generate 12 orthogonal SRSs. To generate the same number of SRSs as in the proposed scheme, two different root indices are used in each cell to generate two orthogonal subsets of SRSs.

All the generated SRSs are transmitted over only one OFDM symbol in each re-transmission period T. For each SRS scheme two interference scenarios are evaluated: interference-free scenario, where T=1 ms (one slot) and T=2 ms (2 slots), and non-orthogonal interference scenario, where T=1 ms.

Figure 9:
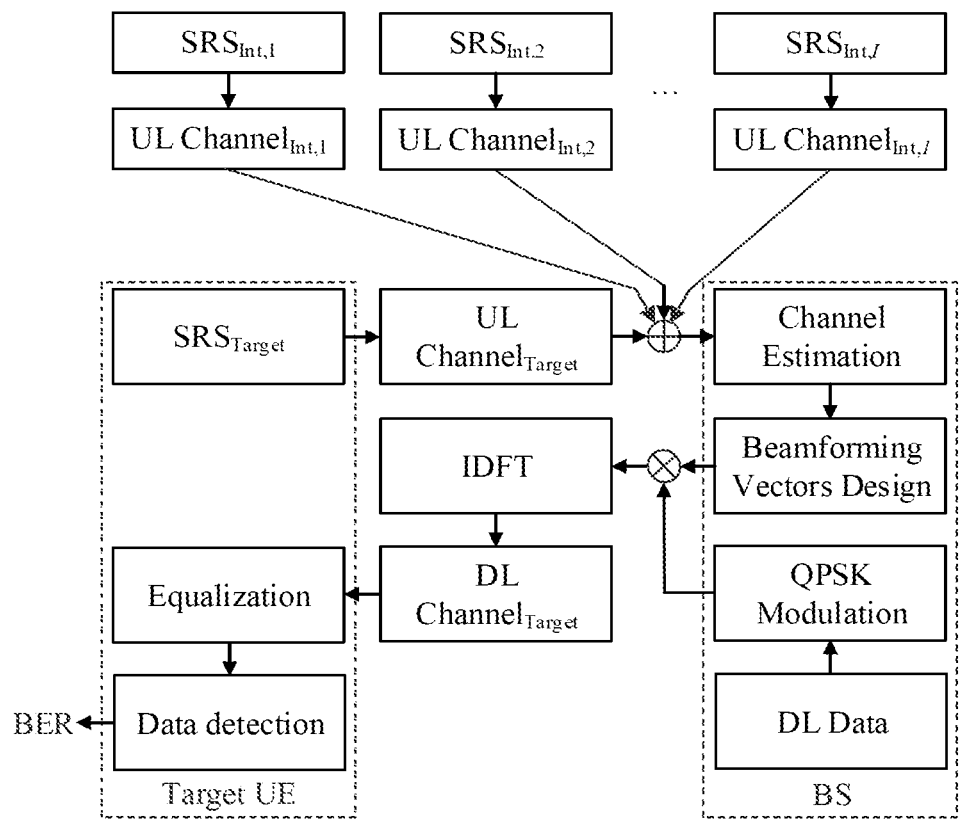
FIG. 9 shows a diagram of a simulation system.

FIG. 9 shows a diagram of a system to be simulated, where there is a target UE besides some interfering UEs. It is assumed that the BS is equipped with a 4×8 antenna array with half-wavelength spacing between adjacent columns/rows, and each UE is equipped with a single antenna. For each UE, a mobility speed of 30 km/h is assumed, and the channel between it and the BS is generated according to the CDL-C channel model (i.e. a fading channel model) with 100 ns desired delay spread and random arrival/departure angles of azimuth (AoA/DoA) rotations. The generated channel is identical for the UL and DL of each UE (i.e. the reciprocity between the UL and DL channels of each UE is assumed), but keeps varying with the time due to the UE mobility.

When the target UE transmits an SRS in its UL channel, some other UEs may also transmit SRSs that are non-orthogonal to the target SRS (i.e. selected from different orthogonal SRS subsets) in the same time-frequency resource and will appear as interference to the target UE at the BS. The BS upon receiving the SRS(s) will then perform UL channel estimation for the target UE at each BS antenna by periodically correlating the received signal with the target SRS, yielding the estimated CIR of the target UE as the segment of its correlator output falling in the detection time window.

For the Comb-4 based SRS scheme the detection time window is always set to t−1=12 (i.e. the minimum ZCCZ length), while for the proposed B-IFDM based SRS scheme, the detection time window is set to t−1=12 when there is no interfering UE, and set to $\lfloor t/Q \rfloor - 1 = \lfloor 13/2 \rfloor - 1 = 5$ when there is at least one interfering UE. The estimated CIR is then converted to the frequency domain via DFT to obtain the estimated channel coefficient at each subcarrier and each BS antenna for use in the subsequent DL data transmission.

For the subsequent DL data transmission, the un-coded information bits are first modulated with QPSK modulation and then allocated to subcarriers in the same frequency band of SRSs, where the beamforming vector for the QPSK data symbol to be transmitted on each subcarrier is designed as the conjugate version of the corresponding estimated UL channel vector on this subcarrier with power normalization. At each BS antenna, all the QPSK data symbols weighted by their corresponding beamforming coefficients are then converted to the time domain via IDFT followed by CP addition and sent to the target UE via its DL channel. For simplicity, only the worst case is simulated when the DL data is transmitted in the end of one SRS period (i.e. the time gap between UL SRS transmission and DL data transmission is set at T, equal to the SRS period). At the receiver, the target UE first performs equalization on the received data signal assuming perfect channel knowledge, and then demodulates the equalized signals on different subcarriers. Finally bit error rate (BER) is calculated based on the demodulation results under each SNR.

Figure 10:
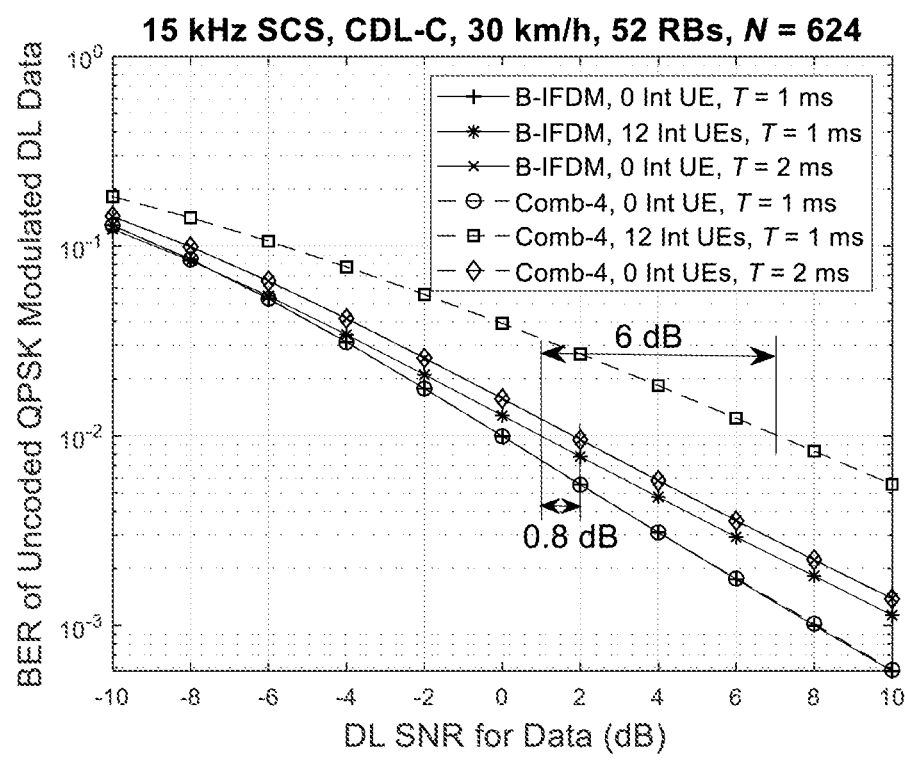
FIG. 10 shows performance of downlink data transmission for different SRS schemes.

FIG. 10 shows the BER performances of the proposed and the reference SRS schemes vs the SNR of DL data transmission obtained based on the above described simulation setting. In FIG. 10, the B-IFDM curves indicate the BER performance of the proposed SRS scheme and the Comb-4 curves indicate the BER performance of the reference SRS scheme. In the interference-free case (i.e. the lines for 0 Int UE), the proposed SRS scheme has the same performance as the Comb-4 based SRS scheme, for both T=1 ms and T=2 ms. However, in the full interference case (i.e. the curves for 12 Int UEs), the proposed SRS scheme significantly outperforms the Comb-4 based SRS scheme by about 6 dB at 1% BER, as indicated in FIG. 10.

Most importantly, the proposed SRS scheme in the full interference case (24 SRSs per cell with T=1 ms) even outperforms by about 0.8 dB at 1% BER the interference free case of the reference scheme with the same number (24) of SRSs transmitted in the TDM manner with the time offset of 1 ms over the period T=2 ms.

As previously mentioned, the first communication device 100 may in embodiments obtain the time domain signal according to the invention using alternative steps.

The first communication device 100 may e.g. be configured to perform the steps of the first communication device 100 according to the fifth or sixth aspect of the invention disclosed in the summary. Thus, the first communication device 100 may in embodiments instead of phase rotating the sequence in the frequency domain based on the constant value $\Delta_q$, cyclically shift the time domain signal based on the constant value $\Delta_q$ to obtain the cyclically shifted time domain signal, as described for the fifth aspect of the first communication device 100.

The first communication device 100 may further obtain the cyclically shifted time domain signal based on the sequence itself, where any two sequences from different subsets of sequences are non-orthogonal when each q-th subset of sequences are inversely phase rotated based on the constant value $\Delta_q$, as described for the sixth aspect of the first communication device 100.

Consequently, the first communication device 100 may in embodiments comprise a set of functional blocks configured to perform the steps of the first communication device 100 according to the fifth or sixth aspect of the invention disclosed in the summary.

Furthermore, the second communication device 300 may in embodiments estimate the radio channel using alternative steps. The second communication device 300 may e.g. be configured to perform the steps of the second communication device 300 according to the seventh, eighth, ninth, or tenth aspect of the invention disclosed in the summary.

Thus, the second communication device 300 may in embodiments phase rotate the local sequence in the frequency domain based on the constant value $\Delta_q$, cyclically shift the local time domain signal based on the constant value $\Delta_q$, or obtain the cyclically shifted time domain signal based on the sequence itself and then estimate the radio channel based on the received time domain signal and the local time domain signal, as described for the seventh, eighth, or ninth aspect of the second communication device 300, respectively.

The second communication device 300 may further obtain the phase rotated local signal based on the sequence itself and then estimate the radio channel based on the phase rotated local sequence in the frequency domain and the sequence in the frequency domain of the received time domain signal, as described for the tenth aspect of the second communication device 300.

Consequently, the second communication device 300 may in embodiments comprise a set of functional blocks configured to perform the functions of the second communication device 300 according to the seventh, eighth, ninth, or tenth aspect of the invention disclosed in the summary.

The first communication device 100 and/or the second communication device 300 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

However, the first communication device 100 and/or the second communication device 300 herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems. The first communication device 100 and/or the second communication device 300 herein may also be denoted as a road side unit such as e.g. a road side unit in a V2X application. The road side unit may be any device/node deployed along roads to improve vehicular network performance, as well as extend the coverage. The road side unit may be a stand-alone device/node or may be integrated with e.g. a network access node.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first communication device 100 and the second communication device 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first communication device 100 and the second communication device 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A first communication device for a communication system, comprising:
at least one processor;
one or more memories coupled to the at least one processor and storing programming instructions for execution by the at least one processor to:
obtain at least one sequence from a subset of sequences with index q in a set of sequences, wherein the set of sequences comprises Q number of subsets of sequences, each subset of sequences comprising A number of orthogonal sequences, wherein any two sequences from different subsets of sequences are non-orthogonal, and wherein q is an integer greater than or equal to 0, Q is a positive integer, and A is an integer greater than 1;
map the at least one sequence from the subset of sequences onto a subset of subcarriers in a set of subcarriers to obtain a sequence in a frequency domain, wherein the set of subcarriers are divided into t number of subbands;
phase rotate the sequence in the frequency domain based on a constant value $\Delta_q$ to obtain a phase rotated sequence in the frequency domain, wherein the constant value $\Delta_q$ is dependent on the Q number of subsets of sequences, the t number of subbands, and the index q of the subset of sequences, and wherein t is a positive integer;
apply inverse Fourier transform to the phase rotated sequence in the frequency domain to obtain a time domain signal; and
transmit the time domain signal to a second communication device.

2. The first communication device according to claim 1, wherein the number of subcarriers in the subset of subcarriers is equal to the length of the at least one sequence, and wherein mapping the at least one sequence onto the subset of subcarriers in the set of subcarriers comprises mapping each element of the at least one sequence onto each subcarrier in the subset of subcarriers.

3. The first communication device according to claim 2, wherein the subset of subcarriers comprises B number of subcarriers in each of the t number of subbands, wherein the distribution of the B number of subcarriers is the same in all the t number of subbands, wherein the B number of subcarriers in each subband is equal to the A number of orthogonal sequences in each subset of sequences, and wherein B is an integer greater than 1.

4. The first communication device according to claim 1, wherein the constant value $\Delta_q$ is a positive integer and is determined according to:

$$\Delta_q = q\lfloor t/Q \rfloor, q=0,1,\ldots,Q-1, \text{ or}$$

$$\Delta_q = \lfloor qt/Q \rfloor, q=0,1,\ldots,Q-1$$

where $\lfloor \ \rfloor$ is the flooring-operator.

5. The first communication device according to claim 1, wherein the programming instructions are for execution by the at least one processor to:
obtain a control message from the second communication device, the control message comprising at least one parameter indicating the at least one sequence, wherein:
the control message comprises a first parameter indicating an index of the at least one sequence in a superset of sequences for the communication system,
the control message comprises a first parameter indicating an index of the set of sequences in a superset of sequences for the communication system and a second parameter indicating an index of the at least one sequence in the set of sequences, or
the control message comprises a first parameter indicating an index of the set of sequences in a superset of sequences for the communication system, a second parameter indicating an index of the subset of sequences in the set of sequences, and a third parameter indicating an index of the at least one sequence in the subset of sequences; and obtain the at least one sequence based on the control message.

6. The first communication device according to claim 1, wherein obtaining the at least one sequence comprises:
obtaining two or more sequences, wherein the two or more sequences are from the same subset of sequences.

7. A second communication device for a communication system, comprising:
at least one processor;
one or more memories coupled to the at least one processor and storing programming instructions for execution by the at least one processor to:
receive a time domain signal in a radio channel from a first communication device, wherein the received time domain signal is associated with a sequence;
apply Fourier transform to the received time domain signal to obtain the sequence in a frequency domain of the received time domain signal;
obtain at least one local sequence from a subset of sequences with index q in a set of sequences comprising Q number of subsets of sequences, each subset of sequences comprising A number of orthogonal sequences, wherein any two sequences from different subsets of sequences are non-orthogonal, and wherein q is an integer greater than or equal to 0, Q is a positive integer, and A is an integer greater than 1;
map the local sequence onto a subset of subcarriers in a set of subcarriers to obtain the local sequence in the frequency domain, wherein the set of subcarriers are divided into t number of subbands;
phase rotate the local sequence in the frequency domain based on a constant value $\Delta_q$ to obtain a phase rotated local sequence in the frequency domain, wherein the constant value $\Delta_q$ is dependent on the Q number of subsets of sequences, the t number of subbands and the index q of the subset of sequences, and wherein t is a positive integer; and
estimate the radio channel based on the phase rotated local sequence in the frequency domain and the sequence in the frequency domain of the received time domain signal.

8. The second communication device according to claim 7, wherein the number of subcarriers in the subset of subcarriers is equal to the length of the local sequence, and wherein mapping the local sequence onto the subset of subcarriers in the set of subcarriers comprises mapping each element of the local sequence onto each subcarrier in the subset of subcarriers.

9. The second communication device according to claim 8, wherein the subset of subcarriers comprises $A_{SC}$ number of subcarriers in each of the t number of subbands, wherein the distribution of the $A_{SC}$ number of subcarriers is the same in all the t number of subbands, wherein the $A_{SC}$ number of subcarriers in each subband is equal to the A number of orthogonal sequences in each subset of sequences, and wherein $A_{SC}$ is an integer greater than 1.

10. The second communication device according to claim 7, wherein the constant value $\Delta_q$ is a positive integer and is determined according to:

$\Delta_q = q\lfloor t/Q \rfloor$, $q=0,1,\ldots,Q-1$, or $\Delta_q = \lfloor qt/Q \rfloor$, $q=0,1,\ldots,Q-1$ where $\lfloor \ \rfloor$ is the flooring-operator.

11. The second communication device according to claim 7, the programming instructions are for execution by the at least one processor to:
provide a control message to the first communication device, the control message comprising at least one parameter indicating the sequence, wherein:
the control message comprises a first parameter indicating an index of the sequence in a superset of sequences for the communication system,
the control message comprises a first parameter indicating an index of the set of sequences in a superset of sequences for the communication system and a second parameter indicating an index of the sequence in the set of sequences, or
the control message comprises a first parameter indicating an index of the set of sequences in a superset of sequences for the communication system, a second parameter indicating an index of the subset of sequences in the set of sequences, and a third parameter indicating an index of the sequence in the subset of sequences.

12. The second communication device according to claim 11, wherein providing the control message to the first communication device comprises:
providing the control message to the first communication device to indicate two or more sequences, wherein the two or more sequences are from the same subset of sequences.

13. A method for a first communication device, the method comprising:
obtaining at least one sequence from a subset of sequences with index q in a set of sequences, wherein the set of sequences comprises Q number of subsets of sequences, each subset of sequences comprising A number of orthogonal sequences, wherein any two sequences from different subsets of sequences are non-orthogonal, and wherein q is an integer greater than or equal to 0, Q is a positive integer, and A is an integer greater than 1;
mapping the at least one sequence from the subset of sequences onto a subset of subcarriers in a set of subcarriers to obtain a sequence in a frequency domain, wherein the set of subcarriers are divided into t number of subbands;
phase rotating the sequence in the frequency domain based on a constant value $\Delta_q$ to obtain a phase rotated sequence in the frequency domain, wherein the constant value $\Delta_q$ is dependent on the Q number of subsets of sequences, the t number of subbands, and the index q of the subset of sequences, and wherein t is a positive integer;
applying inverse Fourier transform to the phase rotated sequence in the frequency domain to obtain a time domain signal; and
transmitting the time domain signal to a second communication device.

14. A method for a second communication device, the method comprising:
receiving a time domain signal in a radio channel from a first communication device, wherein the received time domain signal is associated with a sequence;
applying Fourier transform to the received time domain signal to obtain the sequence in a frequency domain of the received time domain signal;
obtaining at least one local sequence from a subset of sequences with index q in a set of sequences comprising Q number of subsets of sequences, each subset of sequences comprising A number of orthogonal sequences, wherein any two sequences from different subsets of sequences are non-orthogonal, and wherein q is an integer greater than or equal to 0, Q is a positive integer, and A is an integer greater than 1;

mapping the local sequence onto a subset of subcarriers in a set of subcarriers to obtain the local sequence in the frequency domain, wherein the set of subcarriers are divided into t number of subbands;

phase rotating the local sequence in the frequency domain based on a constant value $\Delta_q$ to obtain a phase rotated local sequence in the frequency domain, wherein the constant value $\Delta_q$ is dependent on the Q number of subsets of sequences, the t number of subbands and the index q of the subset of sequences, and wherein t is a positive integer; and estimating the radio channel based on the phase rotated local sequence in the frequency domain and the sequence in the frequency domain of the received time domain signal.

15. The method according to claim 13, wherein the number of subcarriers in the subset of subcarriers is equal to the length of the at least one sequence, and wherein mapping the at least one sequence onto the subset of subcarriers in the set of subcarriers comprises mapping each element of the at least one sequence onto each subcarrier in the subset of subcarriers.

16. The method according to claim 15, wherein the subset of subcarriers comprises B number of subcarriers in each of the t number of subbands, wherein the distribution of the B number of subcarriers is the same in all the t number of subbands, wherein the B number of subcarriers in each subband is equal to the A number of orthogonal sequences in each subset of sequences, and wherein B is an integer greater than 1.

17. The method according to claim 13, wherein the constant value $\Delta_q$ is a positive integer and is determined according to:

$$\Delta_q = q\lfloor t/Q \rfloor, \ q=0,1,\ldots,Q-1, \text{ or}$$

$$\Delta_q = \lfloor qt/Q \rfloor, \ q=0,1,\ldots,Q-1$$

where $\lfloor \ \rfloor$ is the flooring-operator.

18. The method according to claim 13, further comprising:

obtaining a control message from the second communication device, the control message comprising at least one parameter indicating the at least one sequence, wherein:

the control message comprises a first parameter indicating an index of the at least one sequence in a superset of sequences for a communication system, the control message comprises a first parameter indicating an index of the set of sequences in a superset of sequences for the communication system and a second parameter indicating an index of the at least one sequence in the set of sequences, or the control message comprises a first parameter indicating an index of the set of sequences in a superset of sequences for the communication system, a second parameter indicating an index of the subset of sequences in the set of sequences, and a third parameter indicating an index of the at least one sequence in the subset of sequences; and obtaining the at least one sequence based on the control message.

19. The method according to claim 13, wherein obtaining the at least one sequence comprises:

obtaining two or more sequences, wherein the two or more sequences are from the same subset of sequences.

* * * * *